Jan. 16, 1934.          B. A. PROCTOR                1,944,033
                     PHOTOGRAPHIC APPARATUS
              Filed April 30, 1927      8 Sheets-Sheet 1
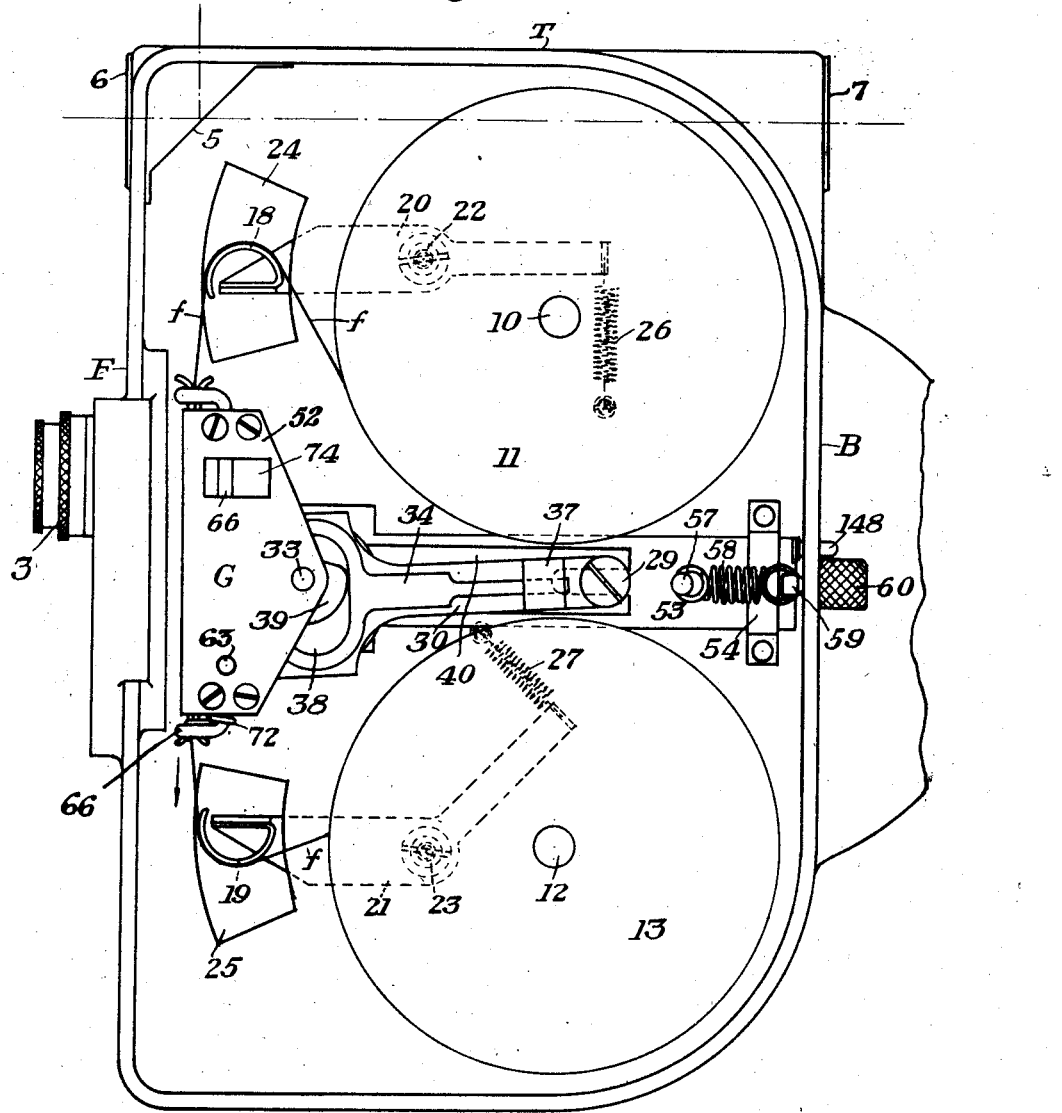
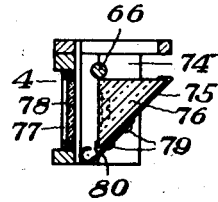
Inventor
Burton A. Proctor Jan. 16, 1934.   B. A. PROCTOR   1,944,033
PHOTOGRAPHIC APPARATUS
Filed April 30, 1927   8 Sheets-Sheet 2
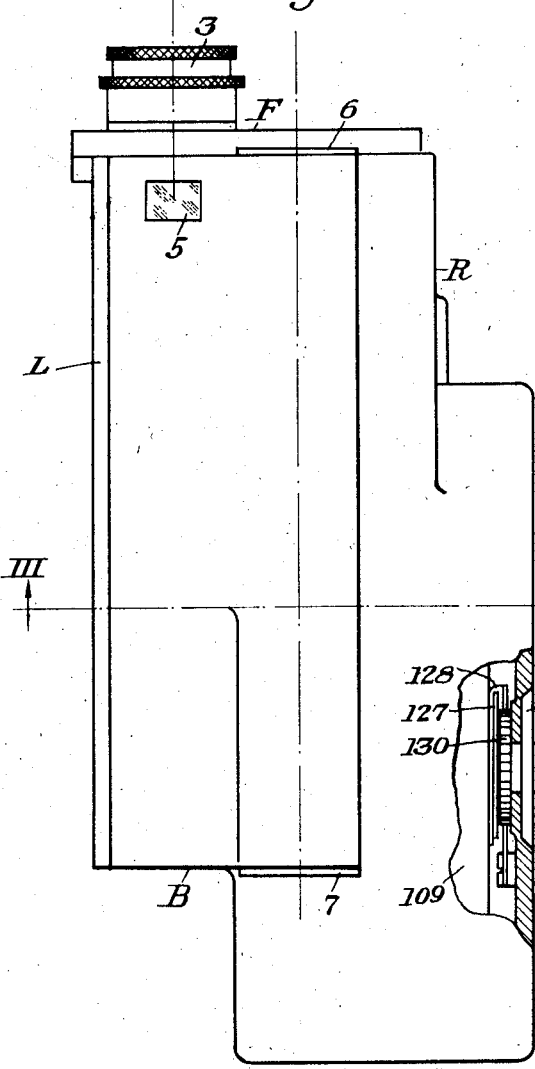
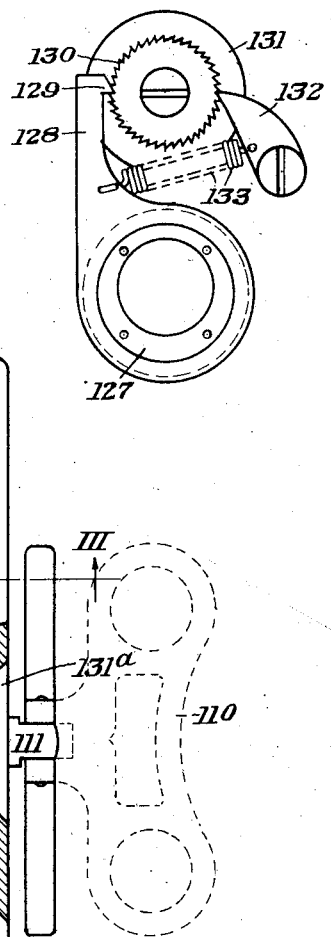

Jan. 16, 1934.  B. A. PROCTOR  1,944,033
PHOTOGRAPHIC APPARATUS
Filed April 30, 1927   8 Sheets-Sheet 3
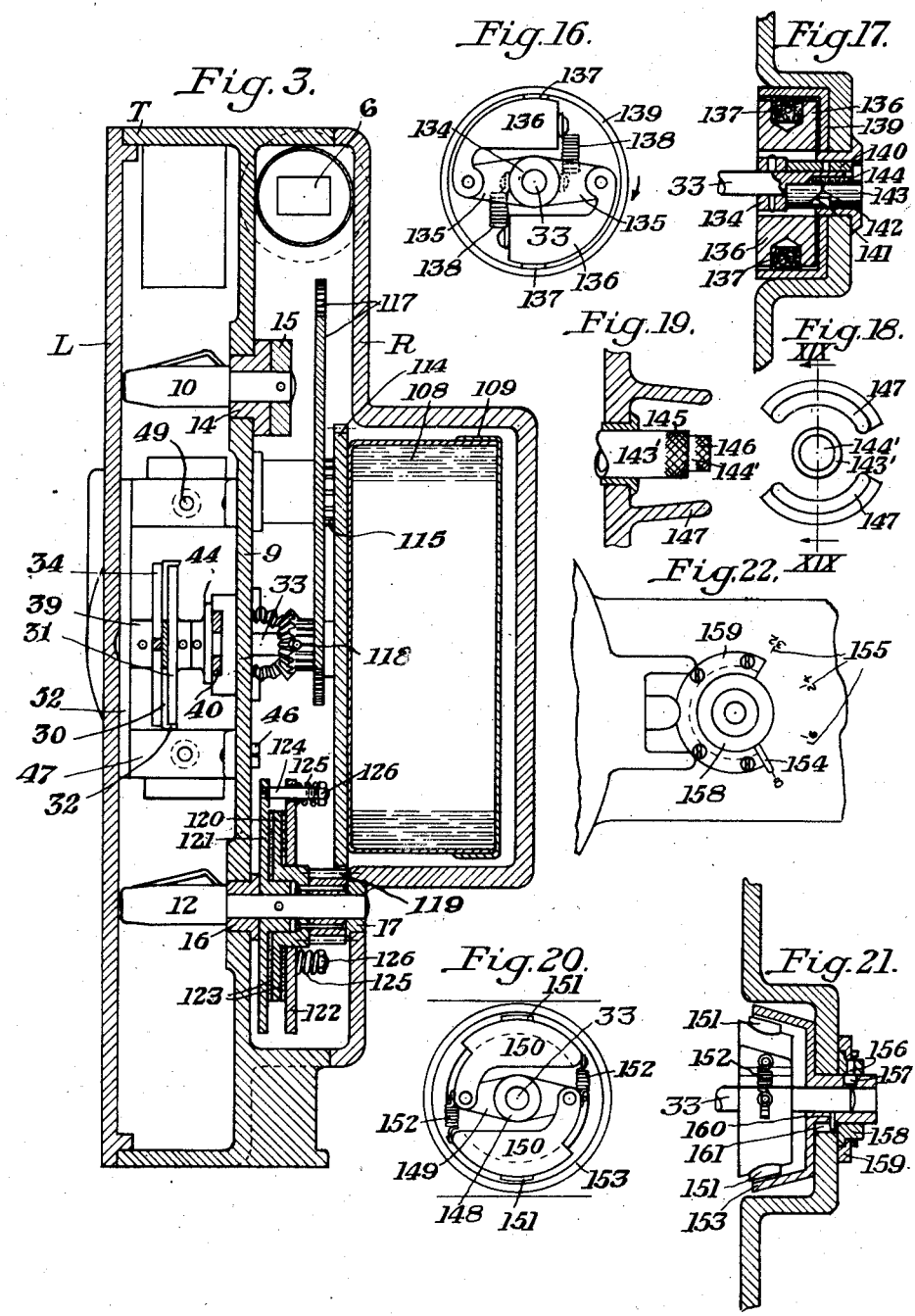

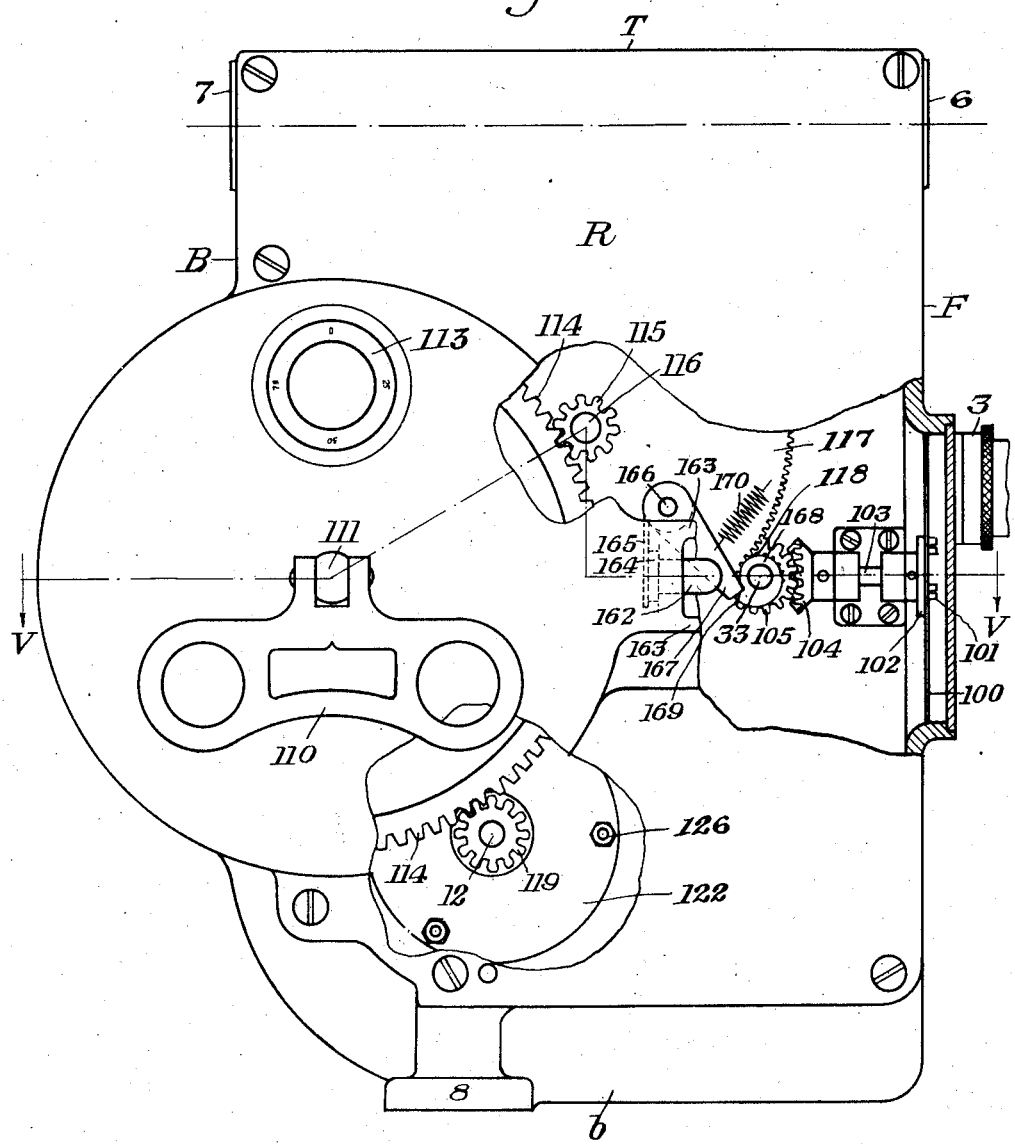

Jan. 16, 1934. B. A. PROCTOR 1,944,033
PHOTOGRAPHIC APPARATUS
Filed April 30, 1927    8 Sheets-Sheet 5
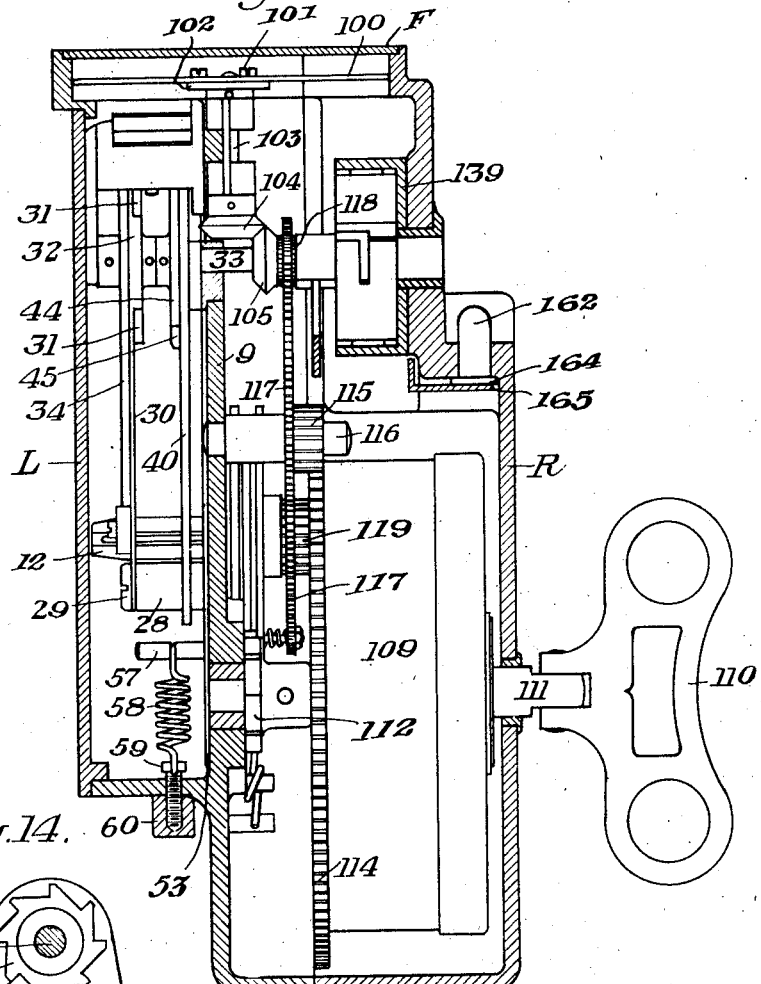
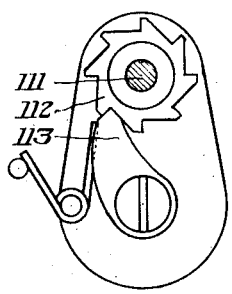

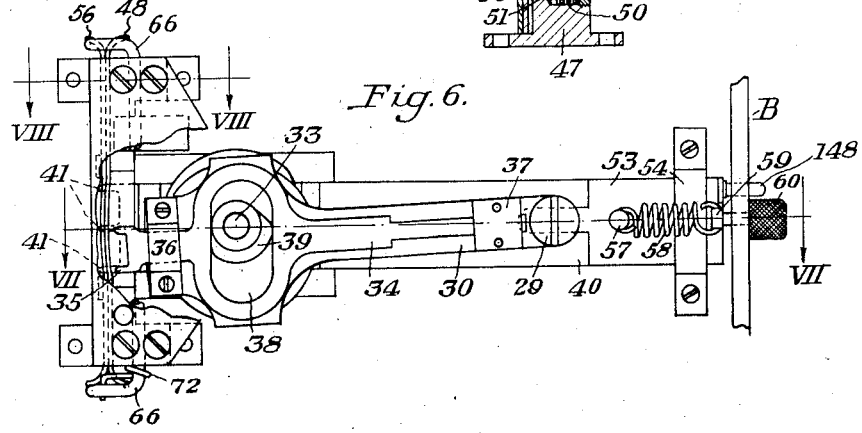

Jan. 16, 1934.    B. A. PROCTOR    1,944,033
PHOTOGRAPHIC APPARATUS
Filed April 30, 1927    8 Sheets-Sheet 7
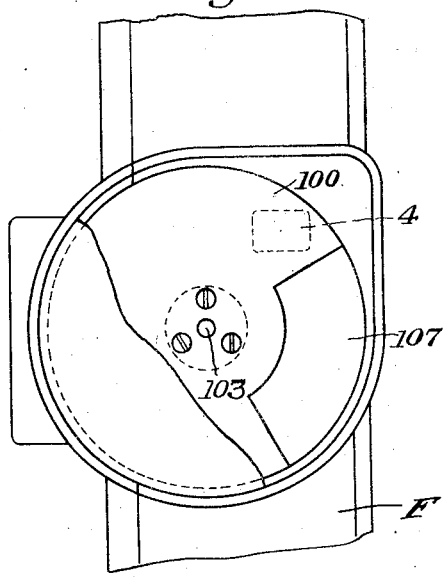
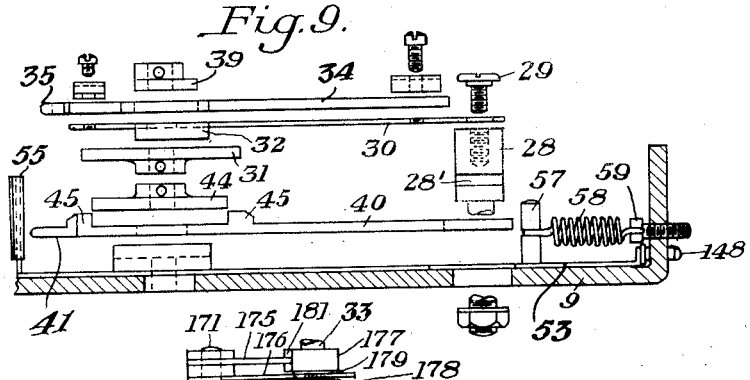
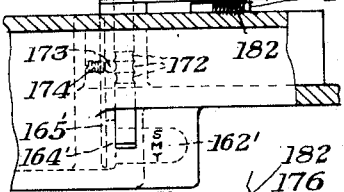
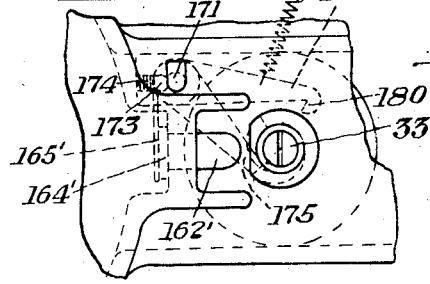

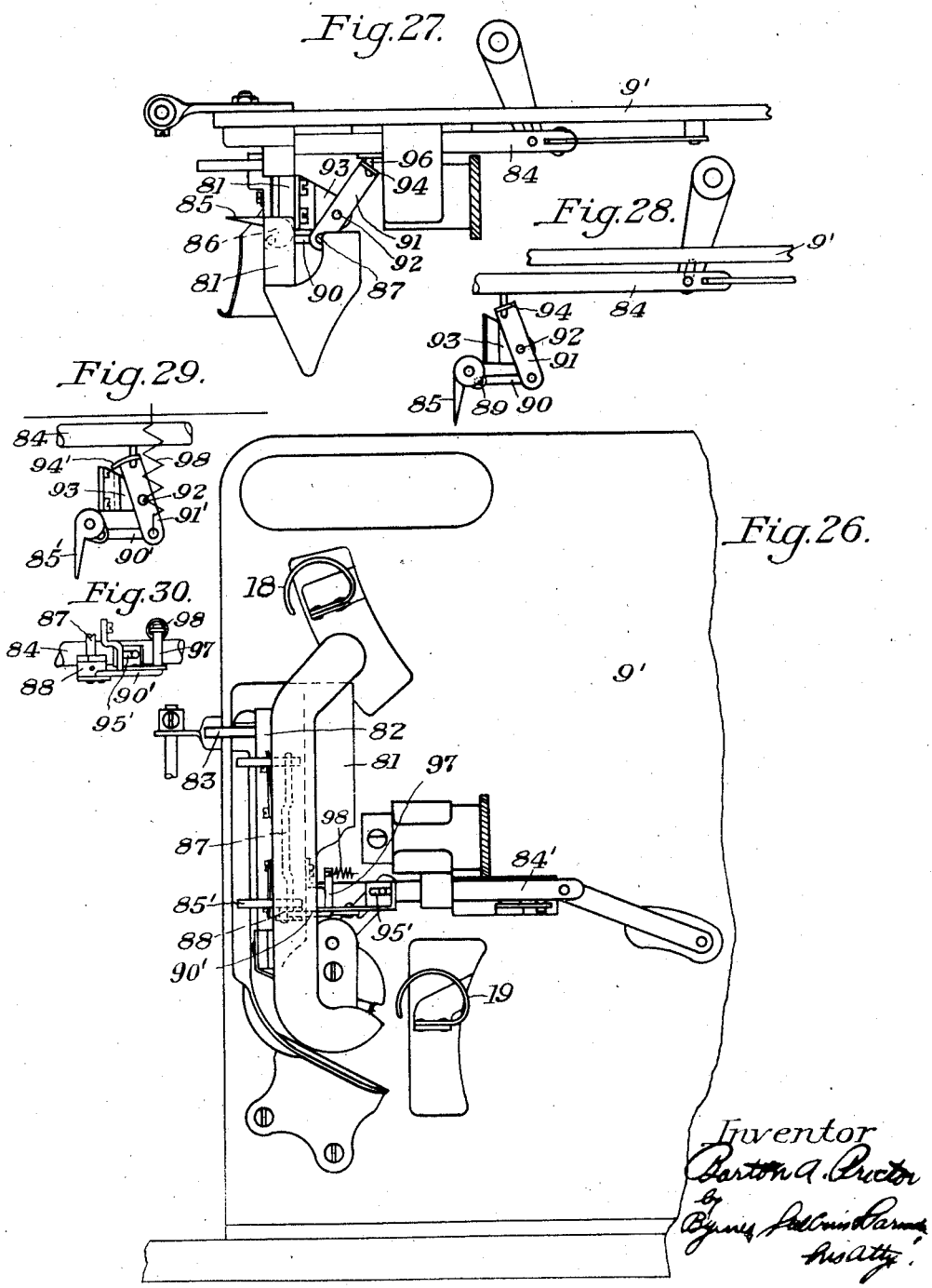

Patented Jan. 16, 1934

1,944,033

UNITED STATES PATENT OFFICE 1,944,033

PHOTOGRAPHIC APPARATUS

Barton Allen Proctor, Pelham, N. Y., assignor, by mesne assignments, to Kinatome Patents Corporation, New York, N. Y., a corporation of New York Application April 30, 1927. Serial No. 187,980

74 Claims. (Cl. 88—17)

The present invention relates broadly to the art of photography, and more particularly to improvements in apparatus adapted for the taking or projection of pictures, but it will be readily understood that it is applicable to many other uses.

My invention provides simple and effective means for the automatic threading of photograpic apparatus without the laborious and difficult manipulation which is required by previous types of projectors and cameras. In apparatus constructed according to this invention, the user merely placed the film in the gate of the apparatus, and the mechanism itself correctly and without damage to the film positions it both in the focal plane of the light and laterally and also in cooperative relationship with the driving means, and automatically creates and maintains the conditions of tension which are necessary for proper operation.

The invention contemplates the use of improved film feeding means and film retaining means preferably in the form of teeth cooperating with a film in the gate in order to give to the film the required intermittent movement to bring successive portions into operative position, and to hold the film definitely in proper registration for exposure or projection.

When the gate of the apparatus is opened, the teeth are completely protected and the film channel is free from obstruction. After the user has placed the film in or about the channel of the gate, he closes the gate, or permits the gate to close itself, touches a trigger which starts the mechanism, and the moving and retaining teeth then automatically find their appropriate places in the perforations of the film, which in the meantime has been automatically and correctly positioned in all planes, and in which the necessary tension is automatically provided and thereafter maintained. After operation, as the user opens the gate the film is automatically stripped and protected from the actuating and retaining teeth so that it may either be removed at will or rewound without removal from the apparatus.

In other cameras and projectors the teeth of the sprocket or other means for moving or holding the film are left exposed since the user must thread the film over these teeth, carefully by hand, placing each perforation upon its appropriate tooth, must clamp it into such position and must provide the necessary loop of slack film, all by manual adjustments requiring skill and care.

An object of my invention is the provision of means whereby the film is automatically placed in correct lateral position. Even though the user be careless or unskilled, if he places the film within the general area of the gate, the mechanism will automatically bring it into the proper plane for correct operation. This correct lateral positioning takes place before the gate can be closed and the edge of the film caught thereby, and before the film moving means can be brought into operative relationship with the film, thus preventing two frequent causes of injury.

In one exemplification of my invention, the placing of the cover upon the photographic apparatus automatically laterally positions the film within the gate and closes the gate. In previously known mechanisms means have been provided for making it impossible to place the cover upon the apparatus before the gate has been properly closed, but in apparatus constructed according to my invention, the mere placing of the cover into position, positively laterally positions the film within the gate and thereafter automatically closes the gate.

Another object of my invention as applied to projection apparatus is the provision of means preventing the insertion of a film in the path of light after the means employed to reduce the heat reaching the stationary film has become ineffective. In other types of apparatus the means employed to shield the stationary film from the heat of the source of light has been arranged so as to be effective either in timed relationship to the starting and stopping of the film moving means or dependent upon the speed of rotation thereof. In my invention I add positive means preventing the insertion of a film in the path of light after the shield has been withdrawn therefrom.

A still further object of this exemplification of my invention is that I prevent the user from attempting to place a film in operative relationship with the film moving means after the same has been started in operation, thus preventing another frequent cause of injury to the film. Moreover, this exemplification of my invention is effective for locking the film against accidental or premature lateral movement.

I provide means visible from the outside of the case whereby the user may observe whether or not the film is being fed through the gate. In case he observes difficulty, caused by an overthick patch or otherwise, he can slowly and gently cause the film to be fed by hand through the gate until normal feeding conditions are reestablished, thus making it unnecessary for the cover to be removed and the film fogged.

In apparatus constructed according to my invention it is possible for the user without opening the camera and fogging the film to open the gate so that any over-thick patch or other obstruction may pass through. When he closes the gate the film is automatically again brought into the proper planes of operation and into proper operative relationship with the moving and retaining teeth.

In other types of cameras, if the film jams in the gate, the difficulty may not be discovered at once, and if and when discovered, can be corrected only by the opening of the apparatus, fogging of all or a portion of the film, and the manual re-threading of the same or another film.

My invention also provides means whereby the user may change the tension of the film gate of a camera without opening the camera and fogging the film therein.

In a camera constructed according to my invention the user can focus directly upon the film in exact operating position in the gate with the resulting fogging of only one small section of the negative. Also a camera constructed in accordance herewith permits the user to focus upon a ground glass in exactly the plane of exposure of the film in case he does not wish to fog even one small section of the film.

My invention provides a new and improved yielding means for driving the spindle which receives the carrier upon which the film is wound after exposure or projection. Such a take-up is immediately and uniformly responsive to changes in feeding conditions, operates uniformly under all weather conditions, is durable, requires no lubrication and demands infrequent adjustment, if any.

Another object of the invention is to provide a meter to indicate the amount of film which has been used, which meter is of simple construction and requires materially less power in its operation than do other types.

My invention provides a new, simple and improved means for changing the character of movement of the film. By a simple adjustment the user may shift from the projection or exposure of pictures in motion to the projection or exposure of still pictures. In a camera constructed in accordance with my invention the user can also immediately shift the control mechanism so that he can make time exposures or instantaneous exposures.

The invention provides a new, simple and improved method for starting and stopping the operation of the mechanism, and also for controlling the speed of movement of the mechanism and hence the rate of feeding of the film. A governor constructed according to one exemplification of my invention makes no use of external friction and is simple to manufacture and adjust. A governor made according to another exemplification of my invention is simple to manufacture and adjust, requires no adjustment by means of the movement of a moving part and can be calibrated with extreme accuracy.

In apparatus manufactured in accordance with my invention the means for moving the film and for locking it into position between movement, for determining the character of its movement, for controlling its speed, and for starting and stopping operation, are all immediately associated with and operated by a common shaft. As one result of this simplicity of construction and operation, full speed is attained almost instantly and stopping is equally quick and positive. In apparatus so constructed, generally but one frame or picture is exposed or projected before the moving means attains full speed, while other apparatus in which the moving means, the starting and stopping means, and the speed control, are remote from each other or connected through gears, absorb a much greater amount of power before full operation is attained and expose a much greater length of film incorrectly.

My invention is particularly adapted to use in a photographic apparatus the motive power for which is a relatively weak source of power, such as a spring. The direct application of power with few gears, the complete elimination of feeding and taking-up sprockets with their journals and shafts, and economy in power requirement of the meter, the provision of an improved governor, and the general simplification of the apparatus, result in a minimum demand for power. As a consequence, the number of feet of film which can be operated through the machine with one winding of the spring is very much increased over that which other apparatus will handle with one winding of a spring of equal power.

My invention not only provides an automatic, easier and more efficient means for placing the mechanism in operation and for its operation, but also it accomplishes this result with a much smaller number of parts, all of which under modern manufacturing conditions can be made simply and cheaply.

Other advantages, objects, and characteristics are apparent from the following description, the attached drawings and the subjoined claims. Although I am showing one preferred embodiment of my invention, it will be readily understood that I am not limited to this particular construction as changes can be readily made without departing from the spirit of the invention or the scope of my broader claims.

It will be readily understood by those skilled in the art that my invention applies to photographic apparatus generically and equally well to either a projector or a camera, although in all but one portion of the following description, I give as an example of my invention its embodiment in a camera.

In the drawings:

Figure 1 is a side elevational view of the apparatus with the side cover removed;

Figure 2 is a top plan view of the apparatus with a portion of the casing broken away to show the mechanism of the meter;

Figure 3 is a vertical sectional view taken along lines III—III of Figure 2, in the direction indicated by the arrows;

Figure 4 is a side elevational view of the opposite side of the apparatus from that shown in Figure 1, with a portion of the casing broken away to show in part the power train, starting and stopping mechanism, frictional take-up and shutter;

Figure 5 is a transverse sectional view taken on line V—V of Figure 4, looking in the direction indicated by the arrows;

Figures 6, 7, 8, and 9 illustrate the intermittent movement. Figure 6 is a detail view as the apparatus is shown in Figure 1 showing this moving mechanism with a portion of the gate broken away. Figure 7 is a cross-sectional view taken upon line VII—VII of Figure 6. Figure 8 is a cross-sectional view of the gate taken upon line VIII—VIII of Figure 6. Figure 9 corresponds to Figure 7, but is an exploded view showing the parts of the movement separated from each other but in relationship to be assembled;

Figure 10 is a view from the rear of the gate with the moving mechanism removed;

Figure 11 is a cross-section of the gate taken on the line XI—XI of Figure 10 showing the gate open with the lateral positioning element in inoperative position, looking in the direction indicated by the arrows;

Figure 12 is a similar view showing the cover of the apparatus brought partially into place, the lateral positioning element having assumed its positioning location;

Figure 13 is a similar view showing the cover completely in place and the gate closed;

Figure 14 is a detailed view of the pawl and ratchet which holds the spring against unwinding;

Figure 15 is a view of the meter actuating mechanism;

Figure 16 is a side elevational view of one form of governor, and Figure 17 a sectional elevation of the same;

Figure 18 is a view of a modified form of governor in which the control and actuating members are prolonged, and Figure 19 is a cross-section of the same, taken on the line XIX—XIX;

Figure 20 is a view of an alternative governor mechanism in which the governor cone is bodily shifted to change the speed of rotation, and Figure 21 is a sectional elevation of the same;

Figure 22 is a side view of a portion of the side of the apparatus of Figure 4 showing the control button and the calibrated means for changing the rate of rotation of the main operating shaft by the shifting of the governor cone shown in Figure 21;

Figure 23 is a front view largely broken away showing the shutter and shutter opening;

Figure 24 shows the trigger and releasing mechanism whereby the apparatus can be operated at will for the taking or projection of motion pictures or still pictures, still pictures being photographed as desired through instantaneous or timed exposures, and Figure 25 is a top view of the same;

Figure 26 shows the lateral positioning means as applied to a projecting machine of the sort described in my copending application No. 54,910, filed September 8, 1925, which has matured as Patent Number 1,894,963. This view shows the gate closed and the positioning element in its extreme locking position, a lost motion device being provided;

Figure 27 is an enlarged detail view showing the positioning element in the locked position;

Figure 28 is a partial detail view showing the positioning element in inoperative or open position;

Figure 29 corresponds to Figure 27 except that a variation of the invention is shown in which the positioning element is provided with lost motion so that it becomes completely operative before the gate is completely closed;

Figure 30 is a detail view corresponding to figure 26 but showing the parts in relationship which is assumed when the positioning element is inoperative; and, Figure 31 shows the means for focussing directly upon the film.

Throughout the drawings and specification like characters apply to like parts.

In carrying out the present invention, there may be provided a casing of suitable construction which, for purposes of description hereinafter will be referred to as having a front wall F, a back wall B, a top wall T, a right hand side wall R, and a left hand side wall L. These various walls may all be carried by or integral with a base b of suitable construction.

On the front wall F of the casing as clearly shown in Fig. 4 of the drawings, is the usual lens assembly 3 which is in line with and directly in front of the aperture 4 (Fig. 23). In the top portion of the casing, immediately above the lens, there may be provided the usual brilliant finder 5 (Fig. 2). To the right of the brilliant finder as viewed in this figure, there is mounted in the front wall F the forward optical element 6 of a telescopic view finder, while in the back wall B is mounted the rear optical element 7. It will thus be seen that the casing itself serves as the body of the telescopic finder thereby making it unnecessary to provide any special lens tube exteriorly of the casing. The bottom wall b may be provided in usual manner with a suitable boss 8 (Fig. 4) into which there may be introduced in any well known manner, a screw or other connecting means whereby the casing may be effectively carried by a suitable support such as a tripod.

Within the casing is a vertically extending web 9. This web extends substantially parallel to the two side walls and has mounted therein adjacent its upper portion, a spindle 10 adapted to receive a supply or delivery reel 11 (Figure 1) while in its lower portion it carries a second spindle 12 adapted to receive a take-up reel 13. The spindle 10 may rotate freely in a bushing 14 in the web 9, the parts being held in the desired position by a collar 15. A similar bushing 16 may be provided for the intermediate portion of the spindle 12, the outer end thereof being mounted in a second bushing 17 in the side R of the casing. Either the delivery spindle 10 or the take-up spindle 12 or both of them may be constructed to co-act with a braking mechanism of any desired nature, such for example, as that disclosed in the copending application Serial No. 44,482 of Bundick and myself filed July 18, 1925. The film f in passing from the supply reel 11 to the take-up reel 13 preferably passes over tension pads 18 and 19 caried respectively by tension arms 20 and 21 having respective pivotal mountings 22 and 23 on the web 9. The tension pads 18 and 19 may pass through suitable openings 24 and 25 in the web 9 whereby they may effectively cooperate with the film. The tension arms are attached at the tension springs 26 and 27 repectively secured at one end to their cooperating tension arm and at the opposite end to the web.

As the film travels downwardly in the direction indicated by the arrow in Figure 1, urged by the intermittent mechanism hereinafter described, it is at once placed under a condition of tension. This causes the upper tension arm 20 through its pad 18 to be depressed as viewed in the drawings whereby the spring 26 is placed under a condition of increased tension. A portion of the pull so exerted upon the film is directly communicated to the mass of film carried by the supply reel 11, and a small portion of the film drawn therefrom. As the film comes to rest in the gate assembly G hereinafter described in detail, the tension arm 20 urged by the power thus previously stored in the spring 26, moves upwardly and draws from the reel an additional supply of film. Simultaneously with the conclusion of this upward movement, however, the intermittently operated moving element is again in action and the film is again pulled downwardly through the gate. A portion of the film required to compensate for that moved downwardly is drawn directly from the source of supply upon the reel 11, and partly from the small quantity of film which his been fed forwardly by the previous upward movement of the tension arm 20. Since in the spindle 10 there is a certain resistance to rotation by reason both of inertia and friction, the reel 11 is caused to move at intermittently varying rates of speed at different parts of each feeding cycle, but in actual practice, it has been found that under ordinary conditions of operation it never comes to a complete stop. The flat spring constituting the spring pad 18 also serves as a cushioning medium between the intermittent feeding mechanism and the film on the supply reel.

The amount of film displaced by each upward movement of the tension arm 20 has been found to ordinarily be considerably less than the amount required for one full frame or picture, or in other words, actually less than the length of film which is actually moved through the gate for each complete cycle. The balance of film required for each cycle, and representing the excess beyond that provided by the upward movement of the tension arm 20 is pulled directly from the source of supply upon the supply reel 11.

Below the gate the corresponding tension arm 21 with its flat spring constituting the spring pad 19 over which the film travels, operates in substantially the same fashion. As the film is pulled downwardly by the downward action of the intermittent feeding mechanism, the tension of the spring 27 operating through the arm 21 causes the spring 19 to remain in contact with the film and to keep it under tension. In the meantime, however, the rotation of the spindle 12 effected by mechanism hereinafter described, tends to wind the film upon the yieldingly driven take-up reel 13 and to compress the spring 27 ready for the beginning of the next cycle of operation. Thus the tension of the film itself and of the spring 27 is opposed to the driving means for the spindle 12, the balance between the two in the invention herein disclosed being maintained exclusively by and through the film.

From the foregoing, it will be apparent that from the beginning of the feeding movement the film is automatically placed under the desired condition of tension without any attention by the operator, and that this condition is automatically maintained during the operation of the apparatus.

Experience has demonstrated that the above method of feeding film whereby it is maintained under conditions of continuously controlled tension throughout the entire length of the film from the supply reel to the take-up reel and whereby the two reels are moved in certain timed relation or synchronism with the intermittent movement at the gate, effects a feeding of the film with considerably less wear to the perforations than is possible with the conventional method of feeding involving the use of continuously rotating feeding and taking up sprockets associated with unsupported loops of slack film. Although it is preferred to utilize a tension control as herein described, it will be understood that the utility of the invention is not limited with respect to the particular mechanism for effecting film feeding and that any desired form of sprockets, take-up mechanism, and the like, with their associated loops of slack, or any other desired mechanism, may be used if preferred.

In an apparatus of the general character herein contemplated in which an intermittent feeding movement of the film is effected, not only must there be provided efficient means for insuring such movement, but it is desirable to provide suitable mechanism for maintaining the film in fixed position within the gate for exposure or projection. These results are accomplished in accordance with the present invention by the provision of the mechanism which will now be described.

Carried by the web 9 at a point generally intermediate the spindles 10 and 12 as illustrated, for example, in Figure 1 of the drawings, and as shown in detail in Figures 5 to 10 both inclusive, is a pin 28 which carries in the form of a screw 29 a pivotal mounting for a plate 30 projecting forwardly therefrom toward the lens. The plate 30 is adapted to have an oscillating movement in a vertical plane imparted thereto by means of a cam 31, the periphery of which bears against projections 32 on the plate. The cam 31 is suitably pinned to a shaft 33 extending transversely through the web 9 and projecting beyond opposite sides thereof. Riding upon the plate 30 is a second plate 34, the outer end of which is shaped to provide fingers 35 effective for engaging openings in the film and pulling the film down after each exposure or projection. The plate 34 rides freely upon the plate 30 and is held in the desired position thereon by guiding straps 36 and 37 affixed in any desired manner to one face of the plate 30. It will be apparent to those skilled in the art that in lieu of the separately attached guiding straps, these straps may comprise portions struck from the body of the plate 30 and shaped as desired to effect a guiding operation.

The plate 34 adjacent its outer end is enlarged to provide an elongated opening 38 of such dimensions as to effectively cooperate with a cam 39 keyed to the shaft 33 for rotation therewith. By reason of this construction, as the shaft 33 rotates, the cam 39 imparts an in-and-out movement to the plate 34 in timed relation to the up-and-down movement of the plate 30 imparted by the cam 31. The cams 31 and 39 occupy such relative positions that the plate 34 is urged forwardly during the time that the plate 30 is stationary. This permits the teeth 35 to be moved forwardly under ideal conditions into engagement with the openings in the film, whereupon the plate 30 is moved downwardly by the cam 31, and carries with it the plate 34 to effect a feeding movement of the film. At the conclusion of this downward movement, the cam 39 becomes effective for moving the plate 34 inwardly to disengage the teeth 35 from the perforations of the film. Thereupon the plate 30 which during this rearward travel of the plate 34 to effect the disengagement referred to has remained stationary, is carried upwardly by the cam 31. In this position, the plate 34 is ready to be moved forwardly to engage the teeth 35 with the film. Each complete cycle of operation, therefore, embodies a forward and rearward movement of the plate 34 during a period when the plate 30 is stationary and then a concomitant movement of the plates 30 and 34 first downwardly with the plate 34 forwardly projected and then upwardly with the plate 34 rearwardly retracted.

In addition to the feeding plate 30 and the film engaging plate 34 there is provided a film retaining plate 40. This film retaining plate is provided at its forward end with a plurality of teeth 41 so arranged as to cooperate with the perforations in a film located between the gate sections. The plate 40 at its rearward end is bifurcated as indicated in Figures 6 and 7 of the drawings to straddle a portion of the post 28, the post being provided with diametrically opposed slots 28' adapted to receive the plate while permitting a sliding movement. The partition 9 is conveniently provided with a bushing 42 through which the shaft 33 passes whereby the bushing provides an effective mounting for the shaft. The bushing may be enlarged as indicated in Figure 7 of the drawings to provide a surface 43 upon which the front end portion of the plate 40 slides. The desired reciprocating movement forwardly and rearwardly of the plate 40 to effect engagement of the teeth 41 with the film and disengagement therebetween is effected by means of a cam 44 keyed to the shaft 33 and revolving therewith against one surface of the plate 40 and within the lugs 45 projecting therefrom for cooperation with the periphery of the cam.

The various cams 31, 39, and 44 are so designed and arranged that at all times during the operation of the apparatus one or both sets of teeth 35 and 41 are meshed with the film. That is, the locking or retaining fingers 41 are never completely withdrawn from the film until after such time as the moving fingers 35 are in engagement with the appropriate perforations. Similarly, the moving fingers 35 are never completely withdrawn from the film until the locking fingers 41 have been moved into engagement therewith.

Since it is desirable that the movement of the plate 30 upon the post 28 shall be relatively slow and limited, the post 28 is preferably spaced a considerable distance rearwardly from the gate.

The gate construction which it is preferred to use in accordance with the present invention, and through which the film passes in position to be engaged by the fingers 35 and 41 heretofore referred to will now be described. Secured to the web 9 in any desired manner, as for example, by means of bolts 46, is a back bracket 47 carrying a movable plate 48 by means of pins 49 normally urged forwardly by means of springs 50 surrounding the pins and cooperating with enlargements 51 suitably formed thereon. Covering the left side of the bracket 47 is a cover plate or shield 52. Cooperating with the back bracket 47 is a movable front bracket 53 guided in any desired manner, such for example as by a guide strap 54 (Figures 6 and 7) carried by the web 9 in any desired manner, the back bracket 47 being slotted adjacent the web 9 to permit the movable front bracket to slide therebetween. The front portion of the movable front bracket 53 is turned laterally toward the left side of the case at substantially right angles to the web 9 to form a supporting plate 55 upon which is carried the front plate 56 of the gate, the movable back plate 48 and the movable front plate 56 being adapted to cooperate to effectively guide a film between the same.

Projecting laterally from the movable front bracket adjacent the guide strap 54 is a post 57 constructed to cooperate with one end of a tension spring 58, the opposite end of which is carried by a screw 59 projecting through the back wall B of the casing for the reception of an adjusting nut 60 by means of which its tension may be varied. By reason of this construction, the user of the apparatus may change the tension of the gate without opening the casing in any manner, and without subjecting any undeveloped film which may be therein to fogging. As indicated in Figure 6 of the drawings, plates 48 and 56 are preferably slightly arcuate to more effectively cooperate with the teeth 35 during their feeding movement, although this is not essential. The construction in any case, however, is preferably such that at the aperture 4 the film occupies a plane at substantially right angles to the axis of the lens assembly 3. Both of the plates are provided with suitable openings to permit movement of the teeth 35 and 41 as hereinbefore described, and the bracket 47 is similarly provided with slots 61 and 62 for the forward ends of the plates 34 and 40 respectively.

As pointed out in the introductory portion of the specification, in order to provide an apparatus which is not dependent for its effective positioning of the film upon an actual act of the operator, the present invention preferably contemplates the provision of means adapted to cooperate with the film for automatically effecting a proper positioning of the film. This is particularly desirable in cases where the apparatus is to be used for the taking of pictures, although it is of advantage when the apparatus is utilized for projection purposes. In accordance with the present invention, such a positioning mechanism may conveniently comprise a pin 63 projecting laterally from the gate through the shield 52. In one side of the pin 63 is a notch 64 adapted to cooperate with a depending projection 65 on a positioning rod 66. The two ends of the positioning rod, as clearly indicated in Figure 6 of the drawings, are bent forwardly at substantially right angles to the major axis thereof and the rod, which as is shown in Figure 6 of the drawings, extends from one edge of the plate 52 to the other, to the rear of and parallel to the film track, and passes through suitable openings in the gate bracket 47. Laterally of the pin 63, that is to say toward the line VII—VII of Figure 6, and intermediate the same and the web 9 is a latch 67 having a pivotal mounting 68 on the bracket 47. This latch is conveniently formed of flat metal with the posterior end 69 thereof bent at an angle to the main body portion of the latch for cooperation with the holding projection 70 on the movable front bracket 53. A tension spring 71 may be so mounted as to normally urge rotational movement of the latch in a counter-clockwise direction about its pivotal mounting 68 as viewed for example in Figures 11, 12, and 13 of the drawings. The positioning rod 66 is normally urged into the position illustrated in Figure 11 by means of a suitable spring 72.

With the construction described, the operation is as follows:

When the gate of the apparatus is open, as indicated for example in Figure 11 of the drawings, the positioning rod 66 is swung into the position illustrated in said figure and out of the plane of the film receiving portion of the gate. The holding projection 70 on the movable front bracket 53 is in engagement with the bent posterior portion 69 of the latch 67 which latch is then held in the position indicated in Figure 11 by the action of the spring 71. With the various parts occupying the positions referred to, the user places the film between the plates 48 and 56, or in approximate position between the same, and urges the pin 63 downwardly either by application of the cover 73 or by directly pushing the pin 63 inwardly with the finger. The parts thereupon tend to assume the position indicated in Figure 12 of the drawings. The partial inward movement of the pin 63 through the operation of the projection 65 on the positioning rod 66 tends to rotate the positioning rod against the action of the spring 72 whereby it assumes a position substantially as indicated in Figures 12 and 13 in which the end portions are substantially normal to the plane of the plates 48 and 56. This rotational movement of the positioning rod will cause the ends thereof to engage one edge of film and effect lateral movement thereof into proper position within the gate even in the event it has not been so placed by the user during the threading operation. Moreover, the positioning rod effects a locking of the film in such position within the gate as clearly apparent from Figure 13 in which the pin 63 is shown moved to its extreme position with the result that the latch 67 has been rotated upon its pivotal mounting 68 to an extent to release the projection 70 and thereby permit the movable front bracket 53 to move rearwardly under the action of the spring 58 for bringing the plates 48 and 56 into close frictional engagement with opposite sides of the film. The rearward movement of the plate 56 under the influence of the spring 58 obviously effects a rearward movement of the film which has previously been properly positioned laterally, and thereby brings the film into proper position for subsequent operation thereof. If, as is possible, the perforations in the film are not in such position as to be engaged either by the moving teeth 35 or the retaining teeth 41, these teeth will bear against solid portions of the film edges. At this time, the film is held closely between the gate sections, these sections being materially longer than the length of the path through which the respective teeth operate. The relationship between the pressure exerted by the spring 58 and that exerted by the springs 50 must be such as to insure a tight holding engagement between the gate plates and the film for the reasons hereinafter more fully referred to. With the film in this position, the mechanism may be started in the manner hereinafter described, to cause either set of teeth to move forwardly against the film. This thrust of the teeth is necessarily communicated to the plates 48 and 56, both of which being yieldingly held by spring pressure, are permitted to move forwardly with the film with the result that the film is not injured. Experience has demonstrated that a film may be threaded in the foregoing manner without showing any wear more times than it has heretofore been possible to thread a film in the conventional manner by hand over a stationary projecting tooth. The film moving teeth 35 thereupon slide along the solid edge portion of the film until they find and enter the perforations provided for that purpose. At that instant, the pressure communicated to the front plate 56 through the front bracket 53 by the spring 58 effects movement of the film into the correct plane within the gate and the apparatus may function in normal manner. From this time onward the pressure springs 50 operating against the greater pressure exerted by the spring 58 permit patches or other irregularities to pass through the gate. At the same time, the relatively greater pressure exerted by spring 58 is sufficient to prevent undue movement of the film within the gate.

When the gate is opened by the forward movement of the front bracket 53, the front plate 56 moves forward followed by the rear plate 48 under the influence of the springs 50. This forward movement of the back plate is slightly more than the length of the thrust of the moving and retaining fingers 35 and 41 respectively whereby the points of the teeth and the plates assume such a relative position that possibility of injury to the film by the teeth during the commencement of the threading operation is made impossible, a clear channel being provided for the rewinding of a film or the placing of a new film as indicated in Figure 11.

It will be understood by those skilled in the art that the pressure exerted by the springs 50 against the plate 48 serves a double capacity, first as is common in the art, they permit sufficient movement of the gate sections to accommodate patches or other irregularities in the thickness of the film. In addition, however, they produce, automatically, sufficient forward movement of the film when the gate is opened to automatically strip the film from the moving and retaining teeth and provide a clear unimpeded path of the character referred to for the removal of the used film or the positioning of a new film. These two functions are in addition to the function of permitting such a movement under any forward thrust of the teeth as to prevent any injury to the film when the teeth at the commencement of the threading operation come into contact with a solid portion of the film body.

Within the fixed back gate bracket 47, as more clearly indicated in Figure 31 of the drawings in detail and in Figure 1 in side elevation, there is provided a slot 74 within which is mounted a suitable bracket 75 carrying a prism 76. With this arrangement, when a user looks into the prism the image will be focused directly onto the film and will be visible thereon. As will be readily understood by those skilled in the art, the cover may be provided with an opening not shown adapted to align with the slot 74, and provided with a magnifying eyepiece in accordance with standard practice. In case the user does not wish to focus directly upon the film and thus fog a small portion thereof, he may accomplish the desired results by reason of the provision of a piece of ground glass 77 carried by clear glass 78 of the exact size and shape of the aperture 4. Attached to the prism bracket 75 in any suitable manner, as for example by means of rivets 79, is a small flat spring 80. The user introduces the glass above referred to between the positioning rod 66 and the front side of the back plate 48, pushing the glass downwardly until the ground glass portion 77 fits into the aperture 4, the whole assembly being maintained in position by the pressure of the spring 80 against the lower portion thereof. It will be readily apparent to those skilled in the art that with the ground glass in position the user may adjust the focus of the lens 3 so that the image is projected with maximum clearness in the exact plane to be occupied by the film, thus making accurate photographic results possible.

For the purpose of further illustrating the utility of the present invention and the possibility of its application to other forms of apparatus with respect to the positioning of a film in correct lateral relationship within a gate, and to the film moving means, it will now be described as applied to photographic apparatus of the general type disclosed in my copending application Serial Number 54,910, filed September 8, 1925, now Patent Number 1,894,963. In this connection, reference is called more particularly to Figures 26 to 30 of the drawings, both inclusive. In such a construction, there is provided a suitable supporting frame 9' supporting a gate section 81 preferably secured to the frame to prevent movement relatively thereto. Cooperating with the relatively stationary section 81 is a relatively movable section 82 adapted to be guided during its movement toward and away from the section 81 by means of a pin 83 projecting rearwardly from the section 81. Secured to the gate section 82 is a rod 84 supported in any desired manner.

As will be apparent from Figures 27 and 28, there are provided film positioning fingers 85 of such nature that when retracted they lie entirely within the area of the gate section 81. In Figure 27 of the drawings, there is indicated in dotted lines a recess 86 within the gate section 81 and adapted for the reception of one of the fingers 85, a similar recess not shown, being provided for the other finger. Connecting with the fingers 85 and suitably attached thereto, is a connecting rod 87. Movement may be applied to the rod 87 and hence to the fingers 85 through operation of arm 88 to which the rod 87 is attached. Inserted within an opening 89 in the arm 88 is a link 90 which in turn is attached to lever 91 having a pivotal mounting 92. The pivot 92 is carried by a bracket 93 projecting from the gate section 81. The end of the lever 91 opposite to that to which the link 90 is attached, may be turned inwardly to provide an angular portion 94 provided with an opening for the reception of pin 96 on the rod 84.

By reason of this construction, it will be apparent that when the rod 84 is moved to the left as viewed in the drawings, it will be effective for rotating the lever 91 in a counter-clockwise direction and effecting thereby a similar rotational movement of the fingers 85 from the position shown in Figure 27 into the position shown in Figure 28. As the fingers 85 move into a position substantially normal to the longitudinal axis of the rod 84, and within the limits of the gate section 81, the gate section 82 is moved relatively to the section 81. This opens the gate and permits the removal of a used film and the insertion of a new film.

Movement of the rod 84 to the right, however, will perform the opposite function, the fingers 85 will be rotated clockwise simultaneously with the closing of the gate whereby they will tend to sweep completely into the gate any film which may have been positioned within the general area of the gate and thereby keep such film locked in position until the rod 84 is again operated.

In many cases, however, such for example as in the case of apparatus in which the film is rewound in the apparatus itself, it is desirable to provide a relatively deep track within the gate section 81 for the film, and perhaps for other reasons to force the film into its correct lateral position well in advance of the complete closing of the gate. In Figures 26, 29, and 30 of the drawings, there is illustrated a modified embodiment of the invention by means of which such an operation may be accomplished. In this form of the invention, parts corresponding to those hereinbefore described are designated by the same reference characters having a prime affixed thereto. In the modification, the lever 91' has its inturned portion 94' substantially arcuate and adapted to receive a relatively long slot 95'. The link 90' is connected to the opposite end of the lever 91' in any desired manner, the link 90', however, being preferably continued beyond the plane of the lever 91' to provide a post 97 for cooperation with a tension spring 98 so positioned as to snap the lever 91' in one direction or the other after it has been moved a predetermined distance in such direction, the elongated slot 95' constituting a lost motion connection between the parts. The spring 98 thus becomes effective for quickly and rapidly completing the travel of the fingers 85' to their completely closed position before the rod 84 has traveled sufficiently to completely close the gate section 82 against the section 81. It will thus be seen that in an apparatus making use of this construction, movement of the film completely into the channel is insured before it is possible for the gate sections to approach each other sufficiently closely to injure the film. In other words, there is provided positive means for completely laterally positioning the film before it is possible for the gate sections to reach their operative position.

By reference to my copending application last referred to, it will be found that means is therein provided for the operation of the rod 84 of Fig. 28 or 84' of Fig. 26 in timed relation to the clutching and declutching of the intermittently moving means, to the clutching and declutching of the rewinding means, to the movement of the stripper and protective means into and out of operative relationship, and to the starting and stopping of the shutter and the movement of the heat shield into and out of operative relationship. These features, while extremely advantageous and desirable, constitute no essential part of the present invention, however, and the rod referred to may be operated either as disclosed therein or in any other desired manner. Where operated in such timed relationship, however, it will be apparent to those skilled in the art that the rotation of the positioning and locking fingers, 85 and 85' is likewise timed with respect to each of the operations set forth.

Certain of the features of my invention relating to the construction, operation and control of the lateral positioning means, described in this application, are disclosed and claimed in my copending application, Serial No. 348,633, filed March 30, 1929, which application is a continuation in part of my copending application, Serial No. 54,910, filed September 9, 1925, which has matured as Patent Number 1,894,963.

In accordance with usual practice, there may be provided a shutter 100 attached in any desired manner, as for example by means of screws 101, to a plate 102 (Figs. 4 and 5) suitably secured to a shaft 103. This shaft may be mounted in any desired manner, and may be driven by the provision of a beveled gear 104 thereon meshing with a similar gear 105 on the transversely extending shaft 33. As illustrated in Fig. 23, the shutter may be provided with an opening 107 of such size as to properly adapt it to the speed of operation of the mechanism as determined by the characteristics of the cams utilized therefor.

The power mechanism for the apparatus preferably comprises a spring 108 mounted within a suitable casing 109 on the right hand side of the apparatus. For winding the spring, there may be provided a key 110 of suitable construction operable for winding purposes in a clockwise direction as viewed in Fig. 4. This effects rotation of the shaft 111 on which the winding key is suitably mounted, reverse rotation of the shaft 111 being prevented by suitable ratchet mechanism as indicated in Fig. 14 which may comprise a ratchet wheel 112 mounted on the shaft 111 and held against reverse rotation by a click spring 113 of usual construction. As the spring tends to unwind in normal manner, it effects counter-clockwise rotation of the driving gear 114 attached to the spring housing and directly meshing with a gear 115 keyed to the shaft 116 preferably extending transversely of the casing and supported by the web 9. Operation of the gear 115 serves to drive the gear 117 suitably secured thereto and meshing with a spur gear 118 on the transverse shaft 33 before referred to.

The gear 114 also meshes with a small gear 119 effective for driving the take up spindle 12 through a suitable friction drive mechanism. This mechanism comprises a driving disk 120 secured in any desired manner to the gear 119, and mounted intermediate driven disks 121 and 122. The driving disk 120 cooperates with a relatively soft yielding material preferably of an organic nature such, for example, as felt indicated by the reference character 123 which material constitutes the actual driving contact. The amount of friction exerted by this driving connection may be adjustably regulated by the pressure exerted between the engaging faces of the driving disk and the driven disks. This may conveniently be controlled by the provision of bolts 124 projecting laterally from the driven disk 121 as viewed in Fig. 3 and provided on its outer ends with compression springs 125, the degree of compression of which may be adjusted by the nuts 126. This enables the pressure and consequently the drag between the parts to be increased or decreased at will, whereby the spring 108 is effective for driving the take-up spindle through a friction or slip drive.

I have found that considerable advantage is gained in the use of a surfacing material of organic nature as herein referred to where such material is much softer and more yielding than the material comprising the other component parts of the clutch. Such a relatively soft yielding material readily adjusts itself to inequalities in the disks or plates which co-act with it in such manner that the operating characteristics are substantially the same at all times. Heretofore it has been customary to utilize materials having but slightly different degrees of hardness, such as steel and cast iron, steel and fibre, or the like.

In accordance with the present invention, I utilize two extremes, thereby insuring a construction in which the softer material will bear against the entire surface of the harder material at all times. Where soft felt is utilized it has been found that the desired relationship will not be effected by changes in humidity, temperature and other conditions to which it may be subjected. It has also been found that a clutch of this nature will out-wear a clutch of the usual construction heretofore provided.

An operator is at all times interested in knowing the amount of film which has been fed through the mechanism and in order to impart this information, an indicating meter of suitable characteristics is conveniently provided. This may be accomplished by providing upon the housing 109 for the driving spring, an eccentric hub 127 with which cooperates an arm 128 (Figs. 2 and 15). The upper end of the eccentric arm is shaped to provide a tooth 129 adapted for cooperation with a tooth wheel 130. Secured to one side of the tooth wheel 130 is a plate 131 preferably located exteriorly of the housing and provided with suitable indicia not shown, indicating footage. A suitable pawl 132 may be utilized for holding the toothed wheel 130 in the position to which it has been moved by the strap 128 and the tooth 129. Conveniently the pawl and strap may be interconnected by a tension spring 133 urging these parts one toward the other on opposite sides of the toothed wheel. By reason of this construction, each rotation of the eccentric 127 effects a movement of the toothed wheel 130 through a predetermined distance which movement is in turn transmitted to the dial 131. The eccentricity is preferably such that the toothed wheel will be advanced one tooth for each revolution of the spring housing. The dial may obviously be reset at will by the operator by rotation thereof in a direction permitted by the pawl and tooth.

In order to control the speed of operation of the apparatus, there is conveniently provided a governor attached directly to the shaft 33 which shaft, from an operating standpoint, may be considered as the main shaft. According to one embodiment of the invention, the desired control may be effected by a mechanism of the character shown in Figs. 5, 16, and 17, and comprising a collar 134 secured to the shaft 33 from which project radially extending arms 135. Each of these arms has pivotally attached thereto, a governor element 136 carrying friction pads 137 adapted as the governor elements are thrown outwardly against the action of the springs 138 to engage the governor cup 139. This cup is preferably mounted on the casing in any desired manner to prevent rotation relatively thereto.

With such a construction, it will be apparent that the tension exerted by the springs 138 controls the movement of the governor elements. In order to permit adjustments of these springs, the inner ends are preferably attached to a sleeve 140 rotatable on the shaft 33. The outer end of the sleeve 140, comprising the right hand end as viewed in Fig. 17, is preferably formed with at least one inclined face 141 adapted to cooperate with a similarly inclined face or faces 142 on a second sleeve 143 movable axially of the shaft 33 and adjustable by means of a screw 144.

By reason of this construction, it will be apparent that as the screw is adjusted inwardly it will effect rotation of the sleeve 140 in such manner as to increase the tension on the springs 138, while if the screw 144 is moved in the opposite direction the tension on the springs will be relieved.

According to one embodiment of the invention, the sleeve 143' of Fig. 19, corresponding to the sleeve 143 before described, may be extended outwardly from the casing and provided with a knurled surface 145. The screw 144' may likewise be carried outwardly and provided with a knurled portion 146 whereby adjustment of the parts is facilitated. Accidental relative movement between these parts, as well as injury to the operator, may be obviated by the provision of a protective guard 147. Such a construction is desirable in certain cases as it permits the operator to rotate the main shaft 33 by hand by engagement with the knurled surface 145. Also, the sleeve 143' projecting as it does, is clearly visible to the operator at all times thereby enabling him to determine whether or not the apparatus is properly operating.

In the event improper operation is observed, such for example, as would be the case of an attempt to feed an overthick patch through the gate, the condition may be immediately rectified by the provision of a projection 148 on the movable front bracket 53, as shown for example in Figs. 6 and 7. The operator, by pushing upon the projection 148 may separate the gate sections to permit the film to move therethrough, the film in the meantime being held in correct lateral position by reason of the positioning rod 66. If the stoppage is such as to be serious, the operator may stop the mechanism and effect hand operation thereof by rotation of the knurled sleeve 143' as before described. This feature is of extreme importance with projectors and particularly where the film is rewound in the apparatus itself. When the desired conditions are reestablished, the operator may release the projection 148 whereupon the spring 58 will restore the parts to the desired position.

According to another embodiment of the invention, the governor mechanism is so constructed that regulation thereof may be effected without the movement of any movable part. Such a modified construction is shown in Figures 20 and 21 in which there is shown secured to the shaft 33 a collar 148 carrying arms 149 to which are secured governor elements 150 provided with friction inserts 151 similar to the inserts 137 previously described. These elements are in turn controlled by tension springs 152. Cooperating with the governor elements is a conical housing 153 which may be shifted axially of the shaft 33. This axial adjustment may be effected by means of a lever 154 as shown in Fig. 22, the lever 154 cooperating with suitable calibrations 155. Rotational movement of the lever 154 is transmitted to the cone 153 by means of a pin 156 lying within a spirally extending slot 157 in the hub of the cone. The pin 156 may be carried by a rotatable collar 158 held in place by a retaining member 159. The governor cone itself is held against rotation by means of a pin 160 projecting therefrom into a slot 161 in the casing of the apparatus. With such a construction, it will be apparent that movement of the cone inwardly or outwardly changes the distance through which the governor elements must move before the friction members carried thereby co-act with the cone.

The starting and stopping of the apparatus as well as the character of movement thereof is controlled directly from the shaft 33. As is illustrated more clearly in Fig. 4 of the drawings, there is provided a trigger 162 which projects through the casing between guard members 163 formed thereon. The trigger 162 is prevented from moving outwardly through the casing by the provision of a shoulder 164 thereon. Bearing against this shoulder is one arm 165 of a pawl having a pivotal mounting 166. The other arm 167 of the pawl is bent so as to clear the governor mechanism before described and cooperate with a cam 168 directly secured to the shaft 33 and provided with a shoulder 169. The pawl is held in the full line position indicated in Fig. 4 by means of a tension spring 170 suitably mounted. When the operator presses the trigger 162 inwardly, it will be apparent that he releases the pawl arm 167 from the shoulder 169 and permits the entire apparatus to operate. The trigger is so located that it is very convenient to the index or middle finger of the right hand of the operator as he grasps the apparatus.

In accordance with one embodiment of the invention, I am enabled to change the operation of the apparatus so that it is adaptable either for continuous photography or the projection of pictures in motion or to the successive exposure of predetermined portions for the taking of individual pictures or the projection of still pictures. At will I can change the character of this exposure or projection from instantaneous, to exposure or projection which is timed for whatever period may be desired. This mechanism by means of which such a change in the operating conditions is effected, is also preferably carried directly by the main shaft 33. In such case, there may be provided a trigger 162' mounted as before described for trigger 162 with its shoulder 164' bearing against the arm 165' of the pawl. The other end of the arm 165' is rigidly secured to a post 171 mounted so that it projects beyond the side of the casing. This post is movably carried by the casing in such manner that it is adapted to be moved to any one of three different positions, indicated on the drawings as S, M, and T, the station S indicating that a snapshot or instantaneous exposure will be taken with the parts in the position indicated thereby; the letter M indicating that pictures in motion or continuous projection will be accomplished while the letter T indicates the taking of time exposures or the projection of a still picture. The post is provided with a series of pheripherally extending grooves 172 adapted to be engaged by a ball 173 urged into holding position by a suitable spring 174.

The post 171 has secured thereto in addition to the arm 165' a pair of arms 175 and 176 extending in diverging relationship and lying on opposite sides of the shaft 33. This shaft is provided with a single tooth ratchet 177 having a comparatively broad face as indicated in Fig. 25, and a second comparatively narrow single tooth ratchet 178, these ratchets being so mounted as to provide a space 179 between the same into which the pawl 176 may extend when the post 171 is in the position indicated in Fig. 25 for the taking or projection of pictures in motion. With the parts in this position, actuation of the trigger 162' rotates the post 171 in a clockwise direction as viewed in Fig. 24, thereby disengaging the pawl 175 from the tooth of ratchet 177 whereby the shaft 33 is permitted to rotate continuously. At this time, the pawl 176 occupies the position referred to between the ratchets 177 and 178.

Should it be desired to take a snapshot or instantaneous exposure or projection, however, the post is moved so that it occupies the station S at which time the pawl 175 still remains in cooperative relation to the ratchet 177. Such movement, however, also brings the pawl 176 into cooperative relation to this ratchet, whereby the hook 180 is adapted to engage with the tooth 181 on the ratchet. With the parts in this position, actuation of the trigger 162' will move the pawl 175 out of engagement with the tooth 181 and permit the shaft 33 to rotate until the tooth 181 is engaged by the hook 180. The rotation of the shaft 33 is sufficient to have uncovered the aperture 4 and brought an opaque portion of the shutter 100 across the same, in which position the parts come to rest. Thereafter, as the trigger is released, a tension spring 182 lifts the pawl 176 and thereby disengages the tooth 181 permitting the shaft 33 to continue its rotation until stopped by the engagement of the pawl 175 with said tooth. Thereupon the parts are immediately ready for the taking of another snapshot. Each depression and release of the trigger, therefore, is effective for the taking of one picture.

When it is desired for any reason to take a time exposure, the post is moved to the station T. With the parts so positioned, the pawl 175 continues in engagement with the rachet 177, while the pawl 176 is brought into cooperative relation with the ratchet 178. Thereupon, the depression of the trigger will disengage the pawl 175 from the tooth 181 and permit rotation of the shaft 106 until the hook 180 on the pawl 176 engages the tooth on the ratchet 178. This tooth will be so arranged that the shaft 33 ceases its rotation at such a time as the opening 107 is in position to uncover the aperture 4. The parts will remain in this position so long as the operator keeps his finger on the trigger 162'. Upon its release, the shaft will be permitted to continue its rotation until engaged by the pawl 175.

It will thus be apparent that a construction of the character indicated provides extremely simple mechanism whereby the character of operation of the apparatus may be varied at will. This constitutes one of the advantages of the present invention.

Another advantage of the invention, and an extremely important one, from the standpoint of ease of operation and length of life of the film resides in the provision of means for automatically correctly positioning a film within a gate where such film has previously been manually brought into approximately the desired position relatively thereto.

Still another advantage of the present invention arises from the gate construction whereby an automatic stripping of the film from the feeding mechanism is accomplished in such manner that an unobstructed space for the removal or insertion of a film is provided, and particularly where the construction of the gate is such as to permit simultaneous movement of the gate sections in the same direction, or relative movement between the gate sections to facilitate the passage of patches or the like through the gate.

Still another advantage of the invention arises from the provision of means whereby the gate may be temporarily opened from a point exteriorly of the casing whereby normal travel of the film may again be permitted without exposing the same to light.

A further advantage of the invention arises from the provision of a construction such that it is impossible to place the casing cover in position on the apparatus without correctly positioning the film, in the event that it has not been previously positioned, thereby precluding the possibility of injury to the film. Such a construction conveniently includes means whereby the film is held positively against any premature lateral movement.

A still further advantage of the invention arises from the use of improved tension and take-up means for the film, from the provision of improved mechanism for indicating the footage of the film which is passed through the apparatus, and from the provision of easily adjusted means adapted by change in the adjustment thereof, to control the speed of operation of the mechanism.

The invention also contemplates such a film feeding and retaining mechanism that feeding of the film is obtained under such conditions that injury thereto is obviated and positive registration of the film in the desired stationary position insured.

Other advantages have been referred to throughout the specification, from which it becomes apparent that different embodiments of the invention may be made within the scope of the inventive disclosure hereof.

I claim:

1. In a film handling apparatus, a gate comprising two directly oppositely disposed sections each movable relatively to the other and each embodying relatively extensive film guiding surfaces and so arranged as to engage a film therebetween, a first spring impelling one of said sections toward the other, and a second spring impelling the second mentioned of said sections toward the first mentioned thereof and in opposition thereto, said first mentioned spring being constructed of a pre-determined magnitude, and said second mentioned spring being constructed of a magnitude different from such pre-determined magnitude.

2. In a film handling apparatus, a toothed film feeding member and a gate cooperating therewith, said gate comprising two parallel oppositely disposed plates movably mounted and adapted to engage a perforated film therebetween, at least one of said plates including an opening through which the teeth of said member may extend into contact with the film, and springs urging each of said plates toward the other and the film disposed therebetween, said plates and said springs being so disposed and constructed that the film is maintained between said plates and in contact with both of the same at the extremity of the area of operation of said member whereby upon the initial operation of said member the thrust of the teeth thereof against the unperforated portion of the film is transmitted in part to such plates and the film thereby protected until such teeth engage in the appropriate perforations of the film.

3. In a film handling apparatus, a toothed film feeding member and means for bringing a film into operative relation with the teeth of said member, said means comprising two oppositely disposed parallel movable plates adapted for disposition in a position outside of the area of operation of said member and in spaced relation to each other whereby a film may be initially inserted between said plates, a first spring for bringing one of said plates into contact with the film and the film into contact with the other of said plates and a second spring constructed of less magnitude than said first spring and arranged for yieldingly maintaining the last above mentioned of said plates in such contact.

4. In a film handling apparatus, a toothed feeding member and means for maintaining the film in operative relation with a tooth thereof and for bodily removing the film from said tooth, said means comprising two parallel plates and a spring urging each of said plates toward the other and toward a film disposed therebetween, said springs being of different magnitudes, said plates being so mounted that under the influence of said spring of minor magnitude one of said plates is held in close relation to the other thereof and a film placed therebetween and under the influence of a spring of major magnitude both of said plates and the film are brought into cooperative relation with said tooth of said member, whereby the film may be fed thereby, and that against the influence of said spring or major magnitude they may be moved away from said tooth while said spring of minor magnitude maintains the film under pressure between said plates, whereby the film is removed from said tooth.

5. In a film handling apparatus, an openable gate, said gate including two parallel oppositely disposed film engaging plates having opposed film engaging surfaces of substantial length, means for mounting said plates for movement relatively to each other, a first spring for moving one of said plates relatively to the other whereby said gate is closed, and a second spring, of relatively less magnitude than said first spring, for yieldingly holding said plates in cooperative relation with each other and a film fed therebetween.

6. In a film handling apparatus, an openable gate, said gate including two parallel oppositely disposed film engaging plates having opposed film engaging surfaces of substantial length, means for mounting said plates for movement relatively to each other, a first spring for moving one of said plates relatively to the other whereby said gate is closed, a second spring, of relatively less magnitude than said first spring, for yieldingly holding said plates in cooperative relation with each other and a film fed therebetween, and means for limiting the effect of said first spring upon said first plate after said first plate has closed said gate so that said second spring may be effective during the feeding operation.

7. In a film handling apparatus, a toothed film feeding member and threading means for initially bringing a film into operative relation with the teeth of said member, said threading means comprising two movably mounted parallel plates, at least one of said plates having an opening through which a tooth of said feeding member may extend into contact with the film, means for disposing both of said plates outside of the area of operation of said feeding member and in spaced relation to each other whereby a film may be initially placed therebetween, means mounted upon said apparatus and operatively interconnected with both of said plates for bringing said plates into cooperative relation with each other and with the film disposed therebetween and for moving said plates and the film therebetween as a unit into the field of operation of said feeding member, and a single actuating member for said last previously mentioned means.

8. In a film handling apparatus, a toothed film feeding member and threading means for initially bringing a film into operative relation with the teeth of said member, said threading means comprising two movably mounted parallel plates, at least one of said plates having an opening through which a tooth of said feeding member may extend into contact with the film, means for disposing both of said plates outside of the area of operation of said feeding member and in spaced relation to each other whereby a film may be initially placed therebetween, a prime mover, a motion-transmitting member mounted upon said apparatus for applying the power of said prime mover to the one of said plates disposed relatively remotely to said teeth for first bringing said plate into cooperative relation with the other thereof and with the film disposed therebetween and for thereafter moving said plates and the film therebetween as a unit into the field of operation of said feeding member.

9. In a film handling apparatus, a toothed film feeding member and threading means for initially bringing a film into operative relation with a tooth of said member, said threading means comprising two movably mounted parallel plates, at least one of said plates having an opening through which a tooth of said feeding member may extend into contact with the film, means for disposing both of said plates outside of the area of operation of said feeding member and in spaced relation to each other whereby a film may be initially placed therebetween, a single actuating member for said disposing means, and mechanism mounted upon said apparatus for bringing said plates into cooperative relation with each other and with the film disposed therebetween and for moving said plates and the film therebetween as a unit into the field of operation of said feeding member.

10. In a film handling apparatus, a toothed film feeding member and means for initially bringing a film into operative relation with a tooth of said member, said means comprising two parallel film-engaging members of substantial length, at least one of said film-engaging members being provided with an opening through which said tooth extends, and unitary control means operatively interconnecting said film-engaging members for moving said film-engaging members into a first position wherein said film-engaging members are spaced apart whereby the film may be initially inserted in the relatively long narrow channel with parallel sides established therebetween, a second position wherein said film-engaging members are placed in cooperative and adjacent position relative to each other and the film whereby the film is held flat therebetween, said first and second positions being outside of the area of operation of said tooth, and a third position wherein said film-engaging members are brought into such area of operation.

11. In a film handling apparatus, a toothed film feeding member, two parallel film engaging plates movably mounted opposite a tooth of said member and at substantially right angles to its longitudinal axis, resilient means for moving the more remote of said parallel plates from a position relatively remote from said tooth and out of the area of operation of said tooth into adjacent relation therewith, and a mounting for the other of said plates on which it is movable from a position between the area of operation of said tooth and said relatively remote position of said other plate into such area of operation, the movement of said first plate under the influence of said resilient means being effective to move the second of said plates and a film which may be placed therebetween into such area of operation and into cooperative relation with said feeding member.

12. In a film handling apparatus, a toothed film feeding member, two parallel film engaging plates movably mounted opposite a tooth of said member and at substantially right angles to its longitudinal axis, resilient means for moving the more remote of said parallel plates from a position relatively remote from said tooth and out of the area of operation of said tooth into adjacent relation therewith, a mounting for the other of said plates on which it is movable from a position between the area of operation of said tooth and said relatively remote position of said other plate into such area of operation, said position for said second plate being spaced from said position for said first plate whereby a film may be placed therebetween, means for holding said plates in said above stated positions, and means for rendering said holding means ineffective, the movement of said first plate under the influence of said resilient means after said holding means has been rendered ineffective being effective to move the second of said plates and a film which may be placed therebetween into such area of operation and into cooperative relation with said feeding member.

13. In a film handling apparatus, a toothed film feeding member and a gate cooperating therewith, said gate comprising two oppositely disposed movably mounted plates adapted to engage a perforated film therebetween, at least one of said plates including an opening through which the teeth of said member may extend into contact with the film, means for maintaining each of said plates in cooperative relation with the other and the film disposed therebetween, and a spring urging said plates and the film maintained therebetween toward the teeth of said member, said plates being so mounted that they are free to move in a direction away from such teeth upon the initial operation of said member whereby the thrust of the teeth thereof against the unperforated portion of the film is relieved.

14. In a film handling apparatus, a toothed film feeding member and a gate cooperating therewith, said gate comprising two movable oppositely disposed parallel plates adapted to engage a perforated film therebetween, at least one of said plates including an opening through which the teeth of said member may extend into contact with the film, means for maintaining said last mentioned plate in cooperative relation with said other mentioned plate and the film therebetween, and a spring urging said plates and the film maintained therebetween toward the teeth of said member, said plates being so mounted that they are free to move against the influence of said spring from a position where they and the film maintained therebetween are disposed in cooperative relation with said feeding member to a position at the extremity of the thrust of the teeth of such member.

15. In a film handling apparatus, a toothed feeding member embodying a film-engaging tooth, means for driving said feeding member so that said film-engaging tooth has a feeding movement in engagement with the film and a return movement independently of the film, and a gate cooperating with said feeding member, said gate including two oppositely disposed film-engaging members adapted to engage a perforated film therebetween, at least one of said film-engaging members having an opening therein so disposed that said tooth of said feeding member may extend therethrough and into contact with the perforations of said film, means for maintaining said film-engaging members in cooperative relation with each other and the film therebetween as a unit, means for mounting said film feeding member and said film-engaging members so that said film feeding member and the unit formed by said film-engaging members with the film therebetween while said maintaining means maintains said film-engaging members and the film in cooperative relation are free to move relatively to each other, and spring means for governing such relative movement between said feeding member and said unit.

16. In a film handling apparatus, a film feeding member and threading means for bringing a film into initial operative contact therewith, said threading means comprising two parallel longitudinally extended oppositely disposed plates, one of said plates having an opening through which a tooth of said feeding member may extend, a mounting for said plates upon which said plates may be disposed outside of the area of operation of said feeding member and spaced from each other whereby a film may be initially inserted therebetween, means for moving first of said plates, which is disposed more distantly from said feeding member than the second of said plates, into operative relation with said feeding member, the first portion of such movement bringing said plate into contact with the second of said plates thereby traversing the space previously existing therebetween and pressing a film which has been placed therebetween into operative relation with both of said plates, and the succeeding portion of said movement bringing said film into operative relation with said feeding member, and means for maintaining said second plate in said predetermined position until said first plate shall have been moved into contact therewith, said maintaining means becoming ineffective upon the contact of said first plate with said second plate.

17. In a film handling apparatus, a toothed film feeding member, two movably mounted parallel plates disposed adjacent said feeding member, each with an extensive and opposed film guiding surface, at least one of said plates being provided with an opening through which a tooth of said feeding member may extend, means for mounting said plates in cooperative relation with each other and a film placed therebetween and within the range of operation of said tooth of said film feeding member whereby the film may be fed thereby, means for moving said plates and the film held therebetween as a unit to a predetermined position outside of the range of operation of said tooth whereby the film is removed therefrom, a latch, and means mounted upon said apparatus for maintaining the one of said plates which is relatively adjacent said tooth motionless in said predetermined position while said moving means continues the movement of said other mentioned plate away therefrom and into operative relation with said latch whereby the film can be conveniently removed from between said plates free from interference from said toothed feeding member.

18. In a film handling apparatus, a toothed film feeding member, two movably mounted parallel plates, disposed adjacent said feeding member, each with an extensive and opposed film guiding surface, at least one of said plates being provided with an opening through which a tooth of said feeding member may extend, means for mounting said plates in cooperative relation with each other and a film placed therebetween and within the range of operation of said tooth of said film feeding member whereby the film may be fed thereby, and means for moving said plates and the film held therebetween as a unit to a position outside of the range of operation of said tooth whereby the film is removed therefrom, said moving means including devices mounted upon said apparatus for maintaining the one of said plates which is relatively adjacent said tooth motionless while said moving means continues the movement of said other mentioned plate away therefrom thus separating said plates whereby the film can be conveniently removed from between said plates free from interference from said toothed feeding member.

19. In a film handling apparatus, a toothed film feeding member, two movably mounted parallel plates each with an extensive and opposed film guiding surface, at least one of said plates being provided with an opening through which a tooth of said feeding member may extend, means for mounting said plates in cooperative relation with each other and a film placed therebetween and within the range of operation of said tooth of said feeding member whereby the film may be fed thereby, a first means for moving the one of said plates which is relatively remote from said tooth to a predetermined position outside of the range of operation of said tooth and relatively far removed therefrom, and a second and separate means mounted upon said apparatus for moving the other of said plates to another predetermined position outside of the range of operation of said tooth, said other position being materially spaced from said first mentioned position and between said first mentioned position and the field of operation of said toothed feeding member.

20. In a film handling apparatus, a toothed film feeding member, two movably mounted parallel plates each with an extensive and opposed film guiding surface, at least one of said plates being provided with an opening through which a tooth of said feeding member may extend, means for mounting said plates in cooperative relation with each other and a film placed therebetween and within the range of operation of said tooth of said feeding member whereby the film may be fed thereby, a first means for moving a first of said plates which is relatively remote from said tooth to a predetermined position outside of the range of operation of said tooth and relatively far from said tooth, a second means mounted upon said apparatus for moving the other or second of said plates to another predetermined position outside of the range of operation of said feeding member and less far therefrom than said first mentioned predetermined position wherein said second plate is materially spaced from said first plate, whereby a film may be removed from such space or threaded therewithin, means mounted upon said apparatus for maintaining said second plate in such position during the continued movement of said first plate away therefrom to said first mentioned predetermined position, and an operative interconnection between said first and second moving means for cooperatively controlling the movement of both thereof.

21. In a film handling apparatus, a gate, said gate comprising two oppositely disposed longitudinally extended parallel film engaging sections each movable relatively to the other adapted to define a path therebetween through which a film may be fed, a first section having an opening therein, a toothed member extending through said opening, means for moving said second section to a predetermined position upon the side of such path opposite that from which said toothed member extends, and a spring for necessarily impelling said first mentioned film engaging section toward said other mentioned section and across such path upon the movement to such position of said second mentioned section.

22. In a film handling apparatus, a gate, said gate comprising two oppositely disposed longitudinally extended parallel film engaging sections each movable relative to the other and adapted to define a path therebetween through which a film may be fed, a first of said sections having an opening therein, a toothed member extending through said opening, means for moving said second section to a predetermined position upon the side of such path opposite that from which said toothed member extends, a spring for necessarily impelling said first mentioned film engaging section toward said other mentioned section and across such path upon the movement to such position of said second mentioned section, and means for limiting said movement of said first mentioned film engaging section whereby the continued movement of said second mentioned section leaves a space between said sections wherein a film may be initially inserted or wherefrom a film may be removed.

23. In a film handling apparatus, a feeding member embodying a film-engaging tooth, means for moving said feeding member so that said tooth has a feeding movement in a feeding direction in engagement with the film and a return movement in another direction independently of the film, and means for removing the film from said tooth, said means comprising two parallel plates so disposed that they hold the film in engagement therebetween, movable means for mounting said plates for disposing said plates with the film maintained therebetween in a first position wherein the film is held in engagement with said tooth in said feeding plane and a second position wherein said plates and the film therebetween is disposed in a plane relatively remote from said feeding plane, means independent of said feeding member for moving said plates while the film is maintained therebetween from said first to said second position, such movement being effective for bodily removing the film from said tooth, and means separate from said feeding member for maintaining said plates in said removed position during the continued movement of the tooth.

24. In a film handling apparatus, a toothed film feeding member and a gate for cooperation therewith, said gate including two parallel film engaging members of substantial length at least one of said film engaging members being provided with an opening through which said feeding member extends, means for mounting said film engaging members for movement relatively to each other and to said feeding member, means for moving said film engaging members between a first position wherein said film engaging members are maintained in cooperative and adjacent relation to each other and a film therebetween and hold said film flat and in the area of operation of said feeding member for engagement and movement thereby and a second position wherein said film engaging members are still maintained in close and adjacent relation to each other and to the film therebetween but are disposed outside of said area of operation, the movement of said film engaging members from said first to said second position being effective to remove the film from a tooth of said feeding member, and to a third position wherein both of said film engaging members are disposed outside of said area of operation of said feeding member and one of said film engaging members is disposed at a distance from the other thereof whereby the film may be removed from between said film engaging members, and an actuating member for said moving means the successive movements of which operate said moving means for disposing said film engaging members in said positions.

25. In a film handling apparatus, a toothed film feeding member and a gate for cooperation therewith, said gate including two parallel film engaging members of substantial length at least one of said film engaging members being provided with an opening through which said feeding member extends, means for mounting said film engaging members for movement relatively to each other and to said feeding member, means for moving said film engaging members between a first position wherein said film engaging members are maintained in cooperative and adjacent relation to each other and a film therebetween and hold said film flat and in the area of operation of said feeding member for engagement and movement thereby and a second position wherein said film engaging members are still maintained in close and adjacent relation to each other and to the film therebetween but are disposed outside of said area of operation, the movement of said film engaging members from said first to said second position being effective to remove the film from a tooth of said feeding member, and to a third position wherein both of said film engaging members are disposed outside of said area of operation of said feeding member and one of said film engaging members is disposed at a distance from the other thereof whereby the film may be removed from between said film engaging members, and an actuating member for said moving means one movement of which operates said moving means for successively moving said film engaging members from said first to said third position through said second position and another movement of which operates said moving means for successively moving said film engaging members from said third to said first position through said second position.

26. In a film handling apparatus, a gate adapted to define a path for a film, a toothed member projecting within such path for feeding the film therealong, and a mounting for said feeding member disposed upon one side of such path, said gate comprising a fixed bracket, said bracket being disposed upon the same side of such path as said mounting, a movable film engaging plate yieldingly mounted upon said fixed bracket, a movable gate bracket extending from a point upon the side of such path opposite that upon which said mounting is disposed and around one edge of such path through an opening in such fixed bracket and to a point upon the opposite side of such path, said fixed bracket being provided with such an opening, a film engaging plate mounted upon said movable bracket and extending therefrom at right angles thereto and disposed opposite said other mentioned film engaging plate mounted upon said fixed bracket, and a spring normally urging said movable bracket in such direction that said film engaging plate mounted thereupon is brought into engagement with said other mentioned film engaging plate.

27. In a film handling apparatus having a support disposed therewithin, a gate adapted to define a path for a film, a toothed member projecting into such path for feeding the film therealong, and a mounting for said feeding member disposed upon one side of such path and extending from said support at right angles thereto, said gate comprising a fixed bracket, said bracket being disposed upon the same side of such path as said mounting and extending from said support at right angles thereto, a film-engaging plate mounted upon said fixed bracket at right angles to said support, a movable gate bracket extending from a point upon the side of such path opposite that upon which said mounting is disposed in a direction parallel to said support and around one edge of such path to a point upon the opposite side of such path and having an opening therein through which said mounting extends, and a film-engaging plate mounted upon said movable bracket and extending therefrom at right angles thereto and disposed opposite said other mentioned film-engaging plate mounted upon said fixed bracket.

28. In a film handling apparatus, a main supporting frame, a first film-engaging member for defining one side of a path for a film, a second and parallel film-engaging member for defining the other side of said path, means fixed to said frame for mounting said first film-engaging member upon said frame at right angles thereto, a movable plate disposed substantially parallel to said frame and adjacent thereto and extending around the edge of the film path relatively close to said frame and defining one edge of said path, said second film-engaging member being mounted upon said plate at right angles thereto, and a spring normally urging said plate in such direction that said second film-engaging member mounted thereupon is moved toward said first film-engaging member.

29. In a film handling apparatus, a gate and means for operating said gate, said gate comprising a fixed bracket, a film engaging member supported thereby, a movable bracket, and a film engaging member supported thereby, and said means comprising a spring for moving said movable bracket in a direction whereby the film engaging member supported thereby is moved toward said other film engaging member, a latch for said movable bracket whereby said movable bracket is maintained with said film engaging member supported thereby in relatively distant relation to said other film engaging member, a spring for holding said latch in operative position, and an actuating member mounted upon said fixed bracket for moving said latch against the operation of said last mentioned spring.

30. In a film handling apparatus, a gate comprising a relatively fixed section and a section movable from a first position wherein it is disposed relatively distantly to said fixed section to a second position wherein it is disposed in cooperative relation thereto, a spring for moving said movable section from such first to such second position, a latch for holding said movable section in such first position against the power of said spring, a member for moving a film into a predetermined position between said sections, and control mechanism operatively connecting said latch and said positioning member and including devices for first operating said positioning member and thereafter releasing said latch thereby allowing said spring to close said gate.

31. In a film handling apparatus, means establishing a path along which a light sensitive film is fed, a toothed feeding member extending into said path for feeding the film along said path, a gate disposed adjacent said path, said gate comprising a plurality of sections, one of said sections being movable and having an opening therein, said section being so disposed that a tooth of said feeding member extends through said opening and into engagement with the film, a casing enclosing said gate and said feeding member for protecting said film from the action of light, and means for moving said movable section away from said feeding member and to a position between the film and said path, such movement being effective to remove the film from said tooth, said moving means including a control member disposed externally of said casing and operable without destroying said light protective relation and a connection extending between said control member and said movable section for moving said movable section bodily to remove the film from said feeding member upon the movement of said control member.

32. In a film handling apparatus, a toothed film feeding member and means for moving a light sensitive film in relation to a tooth of said member, said means comprising two parallel film-engaging members of substantial length, at least one of said film-engaging members being provided with an opening through which said tooth extends, unitary control means operatively interconnecting said film-engaging members for moving said film-engaging members between a first position wherein said film-engaging members are spaced apart whereby the film may be moved freely in the relatively long narrow channel with parallel sides established therebetween, a second position wherein said film-engaging members are placed in cooperative and adjacent position relative to each other and the film whereby the film is held flat therebetween, said first and second positions being outside of the area of operation of said tooth, and a third position wherein said film-engaging members are brought into such area of operation, and a light tight casing enclosing said members and said film, said unitary control means including an actuating member which extends from said means at a point within said casing to a point therewithout whereby said film-engaging members can be moved between said positions without destroying said light protective relation of said casing to said firm.

33. In a film handling apparatus, a gate, means for feeding a light sensitive film through said gate, said gate comprising a fixed section and a section movable relatively thereto, a casing enclosing said gate said feeding means and said light sensitive film for protecting said light sensitive film from the action of light, and means for moving said movable section between a position adjacent said fixed section and a position relatively remote therefrom, said moving means comprising a spring disposed within said casing for moving said movable gate section from one of said positions to the other, an actuating member disposed exteriorly of said casing, an operating connection between said actuating member and said movable gate section for moving said movable gate section against the force of said spring to the other of said positions as force is applied to said actuating member, and means for mounting said moving means for free operation when the force exerted upon said actuating member is released therefrom whereby said spring returns said gate section to the other of said positions upon such release.

34. In a film handling apparatus, a toothed feeding member engaging a light sensitive film for feeding said film, means for subjecting said film to pressure while it is in engagement with said feeding member, means for removing said film from engagement with the teeth of said feeding member and concomitantly freeing said film from pressure, a casing enclosing said feeding member said removing and freeing means and said light sensitive film for protecting said film from the action of light during the operation and manipulation thereof, a movable actuating member placed exteriorly of said casing, and means connecting said actuating member and said film removing and freeing means for operating said film removing and freeing means upon the movement of said actuating member without destroying the protective relation of said casing to said light sensitive film.

35. In a film handling apparatus, a toothed feeding member engaging a light sensitive film for feeding said film, means for subjecting said film to pressure while it is in engagement with said feeding member, means for removing said film from engagement with the teeth of said feeding member and concomitantly freeing said film from pressure, a casing enclosing said feeding member said removing and freeing means and said light sensitive film for protecting said film from the action of light during the operation and manipulation thereof, an actuating member placed exteriorly of said casing, means connecting said actuating member and said film removing and freeing means for operating said film removing and freeing means without destroying the protective relation of said casing to said light sensitive film, means for maintaining said film in a position opposite said toothed feeding member while it is removed therefrom, and means operated by said actuating member and movable into operative relation with the film while so removed from said feeding member for moving it back into operative relation with the teeth of said feeding member while it is guided by said maintaining means.

36. In a film handling apparatus, a toothed film moving member, means for bodily removing a light sensitive film from the teeth of said member, means other than said moving member for moving said film, a film contacting member movable between a first position wherein the film is so disposed as to be fed by said toothed member and moved by said other moving means and a second position wherein the film is so positioned as to be moved by said other moving means and is protected from the teeth of said toothed moving member, the movement of said film contacting member from said first to said second position having been effective to have removed the film from the teeth of said moving member, a casing enclosing said light sensitive film and said previously recited elements for protecting said film from the action of light, and mechanism for operating said film contacting member, said mechanism including an actuating member disposed exteriorly of said casing, and an operative connection between said actuating member and said film contacting member for operating said film contacting member upon the movement of said actuating member without destroying the protective relation of said casing to said film.

37. In a film handling apparatus, an openable gate through which a light sensitive film is adapted to travel, said gate comprising two sections one of which is movable relatively to the other between a first or adjacent relation wherein it subjects the film to pressure from both sections of said gate and a second or distant relation wherein such pressure is relieved and the film allowed a measure of freedom of movement, a casing enclosing said gate and said film for protecting said light sensitive film from the action of light, means for moving said movable section between said positions, said means comprising a member disposed exteriorly of said casing and connections extending from said member to the interior of said casing and into operative connection with said movable gate section for moving said movable section away from said fixed section upon the movement of said actuating member, said actuating member and said connections being so positioned that the operation thereof does not destroy the protective relation between said casing and said light sensitive film, and means for maintaining said film in the space between said gate sections and against lateral movement in relation to said gate while said movable section of said gate is disposed in said second or distant relation from said fixed section thereby relieving such pressure whereby upon a subsequent movement of said movable gate section to said first or adjacent relation the film will be in proper operative position within said gate.

38. In a film handling apparatus, a member for feeding a light sensitive film, a presser member for holding said light sensitive film pressed into operative relation with said feeding member, a casing enclosing said feeding member, said presser member and said light sensitive film for protecting said light sensitive film from the action of light, an actuating member disposed exteriorly of said casing, means operatively connecting said actuating member and said presser member for moving said presser member to relieve the pressure upon the film without destroying the protective relation of said casing in relation to said light sensitive film, and means for locking the film against lateral movement and in a position opposite said toothed feeding member while the pressure thereupon is relieved, whereby upon a subsequent movement of said presser member to re-establish said pressure said film will be properly positioned relatively to said presser member, and means for moving said locking member to and from locking position.

39. In a film handling apparatus, an openable film receiving gate, said gate including a first section and a second section movable a substantial distance relatively to said first section between a first position relatively distant from said first gate section and a second position relatively adjacent thereto, means for feeding a light sensitive film through said gate between said first and second sections thereof, a protective casing enclosing said gate said feeding member and said light sensitive film for protecting said light sensitive film from the action of light during the operation thereof, means for moving said second or movable gate section from said first to said second position, a control member for said gate moving means disposed exteriorly of said casing, a connection between said control member and said gate moving means for controlling the operation of said gate moving means upon the movement of said control member, and means independent of said gate moving means for maintaining said gate sections in resilient relation to each other during the feeding of a film therebetween.

40. In a film handling apparatus, an openable film receiving gate, said gate including a first section and a second section movable a substantial distance relatively to said first section between a first position relatively distant from said first gate section and a second position relatively adjacent thereto, means for feeding a light sensitive film through said gate, a protective casing enclosing said gate said feeding member and said light sensitive film for protecting said light sensitive film from the action of light during the operation thereof, a first spring for moving said second or movable gate from said first to said second position, a control member for said first spring disposed exteriorly of said casing, a connection between said control member and said first spring for controlling the operation of said first spring by said control member, and a second spring independent of said first spring for maintaining said gate sections in resilient relation to each other during the feeding of a film therebetween.

41. In an apparatus for handling a light sensitive film, a gate, said gate comprising a fixed section and a section movable relatively thereto between a first position wherein said movable section is disposed in adjacent relation to said fixed section whereby said film may be fed therebetween and said film is subjected to the pressure required by the normal feeding operation and a second position wherein said movable section is disposed in relatively distant relation to said fixed section whereby said pressure is relieved, means for latching said movable section in one of said positions, means for feeding said film between said sections, a casing enclosing said gate said feeding means and said film for protecting said film from the action of light, said casing being formed with an opening giving access to said gate, a cover for closing said opening, means operable while said cover closes said opening for rendering said latching means ineffective whereby said movable section is free to move unhindered thereby, and control means operable from the outside of said casing while said latching means is ineffective for moving said movable section at will from either of said positions to the other without destroying the protective relation of said casing, said control means including an actuating member disposed outside of said casing, and a connection extending from said actuating member within said casing and into operative contact with said movable gate section.

42. In a film handling apparatus, a member for feeding a film, operable means for bodily moving the film into operative contact with said member, a casing enclosing said member and means, said casing being formed with an opening therein, a cover movable to a position wherein it closes such opening, and mechanism for operating said means, said mechanism comprising a spring normally tending to operate said means, a latch for said spring, and an actuating member for said latch so positioned that upon the movement of said cover into such position said latch is operated thereby releasing said spring and operating said means.

43. In a film handling apparatus, toothed means for feeding a film, a member movable from a first position wherein it protects the film from the teeth of said means to a second position wherein it permits engagement between the film and such teeth, a casing enclosing said means and member, said casing being formed with an opening therein, a cover movable to a position wherein it closes such opening, means for operating said member, and a member for actuating said means, said actuating member being so disposed that the movement of said cover into such position operates said member.

44. In a film handling apparatus, toothed means for feeding a film, a member movable from a first position wherein it protects the film from the teeth of said means to a second position wherein it permits engagement between the film and such teeth, a casing enclosing said means and member, said casing being formed with an opening therein, a cover movable to a position wherein it closes such opening, means for moving said member from said first to said second position and a control member for actuating said moving means, said control member being so disposed and constructed that the movement of said cover into such position operates said control member which thereby actuates said moving means which moves said first mentioned member from said first to said second position.

45. In a film handling apparatus, a gate, said gate including a plurality of sections one of which is movable relatively to another, means cooperating with said sections and engaging a film for initially moving a film into a predetermined position within said gate between said sections thereof, a casing enclosing said gate, said casing being formed with an opening therein, a cover movable to a position wherein it closes such opening, and mechanism for operating said moving means, said mechanism comprising an actuating member so disposed and constructed that the movement of said cover into such position wherein it closes such opening actuates said member and thereby operates said moving means.

46. In a film handling apparatus, a gate, means for laterally and initially moving a film into a predetermined position centrally of said gate, a casing enclosing said gate, said casing being formed with an opening therein, a cover movable to a position wherein it closes such opening, and mechanism for operating said moving means, said mechanism including an actuating member so disposed and constructed that the movement of said cover into such position wherein it closes such opening actuates said member and thereby operates said moving means.

47. In a film handling apparatus, an openable gate having a relatively fixed section and a section movable to an open position away from said fixed section, a member movably mounted adjacent said gate for movement against an edge of the film for sweeping the film laterally into the space which intervenes between said fixed section and said movable section while said movable section is disposed in said open position, a casing for enclosing said light sensitive film and said gate and said member and having an opening, a cover movable to a position wherein it closes said opening, and an actuating member operatively interconnected with said positioning member for causing the movement of said positioning member upon the movement of said actuating member, said actuating member being so positioned that the movement of said cover into said position wherein it closes said opening operates said actuating member.

48. In a film handling apparatus, a gate, said gate comprising a plurality of sections, a first means for moving one of said sections from a position relatively distant from the other to a position adjacent thereto, a second means for moving the film into the space intervening between said sections when said first mentioned section is disposed in such distant position, a protective casing enclosing said gate, said casing being formed with an opening therein, a cover movable to a position wherein it closes such opening, mechanism for operating both of said means, and an actuating member for said operating mechanism so disposed and constructed that upon the movement of said cover into such position closing such opening said actuating member first actuates said first means which thereupon moves the film into the space intervening between said sections when said first mentioned section is disposed in such distant position and thereafter actuates said second means which thereupon moves said first mentioned section into such position adjacent said other mentioned section.

49. In a film handling apparatus, an openable film receiving gate, a casing enclosing said gate, said casing being formed with an opening therein, a cover movable to a position wherein it closes such opening, and means for closing said gate, said means comprising a spring normally tending to close said gate, a latch for said spring, and an actuating member for said latch so positioned that upon the movement of said cover into such position said latch is operated thereby releasing said spring and closing said gate.

50. In a film handling apparatus, a member for feeding a film, operable prime moving means for bodily moving the film into operative contact with said feeding member, a casing enclosing said member, said casing being formed with an opening therein, a cover movable to a position wherein it closes such opening, and a control member movable relatively to said cover and effective for rendering said moving means operative, said control member being so disposed that the movement of said cover into such position moves said control member which thereupon renders said moving means operative.

51. In a film handling apparatus, an openable film receiving gate, a protective casing enclosing said gate and a light sensitive film therewithin, said casing being formed with an opening therein giving access to said gate, a cover movable to a position wherein it closes such opening, source of power other than the movement of said cover for closing said gate, and means operated by the movement of said cover into such position for applying said source of power to said gate whereby said gate is closed.

52. In a film handling apparatus, an openable gate, a casing enclosing said gate, said casing including an opening giving access to said gate, a cover movable to a position wherein it closes said opening, means for closing said gate, means operated by the movement of said cover to said position for rendering said gate closing means effective to close said gate, and means operatively disconnected from said cover by the operation of said gate closing means for maintaining said gate in closed position.

53. In a film handling apparatus, an openable gate, a casing enclosing said gate, said casing including an opening providing access to the gate, a cover movable to a position wherein it closes said opening, means for closing said gate, means actuated by the movement of said cover to said position for rendering said gate closing means effective to close said gate, and spring means independent of said cover after said gate closing means has operated to close said gate for maintaining said gate in closed position.

54. In a film handling apparatus, an openable gate through which a film is adapted to travel, means for feeding the film through said gate, a latch for said gate, a casing enclosing said gate and said feeding means, said casing being provided with an opening, a cover movable to a position wherein it closes said opening, means operatively interconnected with said cover for unlatching said latch upon the movement of said cover to a position wherein it closes said opening, and means operable from the exterior of said casing for opening and closing said gate after said latch has been unlatched.

55. In an apparatus for handling a light sensitive film, a gate, said gate comprising a fixed section and a section movable relatively thereto between a first position wherein said movable section is disposed in adjacent relation to said fixed section whereby said film may be fed therebetween and said film is subjected to the pressure required by the normal feeding operation and a second position wherein said movable section is disposed in relatively distant relation to said fixed section whereby said pressure is relieved, means for feeding said film between said sections, a casing enclosing said gate said feeding means and said film for protecting said film from the action of light, an opening in said casing, a cover movable to a position wherein it closes said opening, means for latching said movable gate section in one of said positions, means operatively connected with said cover and necessarily operative for unlatching said latching means while said cover is disposed in said position, and control means operable from the outside of said casing for moving said movable section at will from either of said positions to the other, said control means comprising an actuating member disposed outside of said casing, and a connection extending from said actuating member within said casing and into operative contact with said movable gate section.

56. In a film handling apparatus, a gate comprising a relatively fixed section and a section movable from a first position wherein it is disposed relatively distantly to said fixed section to a second position wherein it is disposed in cooperative relation thereto, a spring for moving said movable section from said first to said second position, a latch for holding said movable section in said first position against the power of said spring, a member for laterally moving the film into a predetermined position centrally between said sections, and control mechanism operatively interconnecting said latch and said positioning member and including devices for operating said positioning member and releasing said latch thereby allowing said spring to close said gate.

57. In a film handling apparatus, an openable gate having a relatively fixed section and a section movable to an open position away from said fixed section, a member pivotally mounted adjacent said fixed section for movement against an edge of the film for sweeping the film laterally into the space which intervenes between said fixed section and said movable section while said movable section is disposed in said open position, an actuating member mounted adjacent said fixed section for movement substantially parallel to the plane of the film, and operating mechanism between said actuating member and said pivotally mounted member for operatively moving said pivotally mounted member upon the movement of said actuating member, said actuating member being arranged with a protruding extension, whereby said actuating member may be moved for causing said film to be swept into position between said gate sections.

58. In a film handling apparatus, an openable gate having a relatively fixed section and a section movable to an open position away from said fixed section, a member pivotally mounted adjacent said fixed section for movement against an edge of the film for sweeping the film laterally into the space which intervenes between said fixed section and said movable section while said movable section is disposed in said open position, and an actuating member mounted adjacent said fixed section for movement substantially parallel to the plane of the film, and operating mechanism between said actuating member and said pivotally mounted member for operatively moving said pivotally mounted member upon the movement of said actuating member.

59. In a film handling apparatus, in combination, an openable gate having a fixed section and a section movable away from said fixed section to an open position wherein there is provided a film-receiving opening between said sections, a film-positioning member pivotally mounted adjacent said gate for angular movement toward the work face of said gate and transversely to the plane of said work face for moving the film sidewise into said opening between said gate sections, an actuating member for said film-positioning member, said actuating member being mounted adjacent said gate and having a protruding extension on the side adjacent said film-receiving opening, and an operating connection between said actuating member and said film-positioning member for operatively moving said film-positioning member upon inward movement of said protruding extension of said actuating member.

60. In a film handling apparatus, in combination, an openable gate having a fixed section and a section movable away from said fixed section to an open position wherein there is provided a film-receiving opening between said sections, a film-positioning member pivotally mounted adjacent said gate for angular movement toward the work face of said gate and transversely to the plane of said work face for moving the film sidewise into said opening between said gate sections, an actuating member for said film-positioning member, said actuating member being mounted adjacent said gate, and an operating connection between said actuating member and said film-positioning member for operatively moving said film-positioning member upon movement of said actuating member.

61. In a film handling apparatus, in combination, an openable gate having a fixed section and a section movable away from said fixed section to an open position wherein there is provided a film-receiving opening between said sections, a film-retaining member pivotally mounted adjacent said gate for angular movement toward and away from the work face of said gate and transversely to the plane of said work face for engaging an edge of the film for maintaining it in said opening between said gate sections, a spring for moving said film positioning member from such operative and film-maintaining relation to said gate sections, and operating means for moving said film-positioning member against the power of said spring toward said position.

62. In a film handling apparatus, in combination, an openable gate having a relatively fixed section and a section movable away from said fixed section to an open position wherein there is provided a film-receiving opening between said sections, a film-positioning member pivotally mounted adjacent said gate for angular movement toward said gate and transversely to the plane of the work face of said fixed gate section for moving the film sidewise into said opening between said gate sections, an actuating member for said film-positioning member, said actuating member being mounted adjacent said gate and having a protruding extension on the side adjacent said film-receiving opening, operating mechanism between said actuating member and said film-positioning member for operatively moving the same upon inward movement of said protruding extension of said actuating member, means urging said movable gate section to closed position relatively to said fixed gate section, means for latching said movable gate section in open position, and means operated by said actuating member for releasing said latching means whereby said gate is closed in timed relation to the operation of said positioning member.

63. In a film handling apparatus, in combination, an openable gate having a fixed section and a section movable away from said fixed section to an open position wherein there is provided a film-receiving opening between said sections, a film-positioning member pivotally mounted adjacent said gate for angular movement toward said gate and transversely to the plane of the work face of said fixed gate section for moving the film sidewise into said opening between said gate sections, an actuating member for said film-positioning member, said actuating member being adjacent said gate, operating mechanism between said actuating member and said film-positioning member for operatively moving the same upon movement of said operating member, means urging said movable gate section to closed position relative to said fixed gate section, means for latching said movable gate section in open position, and means operated by said actuating member for releasing said latching means whereby said gate is closed in timed relation to the operation of said positioning member.

64. In a film handling apparatus, continuously operating means for supporting a light sensitive film, intermittently operating means for feeding said film in relation to said continuously operating means, means for increasing the stretch of said film between said continuous and intermittent means initially or if during the normal feeding operation such stretch should become abnormally shortened, a casing enclosing all of said means and said light sensitive film for protecting said film from the action of light during said normal feeding operation, said stretch increasing means including film contacting means disposed within said casing, means for rendering said film contacting means operative to increase said stretch of the film between said continuous and intermittent means, a movable actuating member disposed exteriorly of said casing, and an operating connection extending from said actuating member to the interior of said casing and into operative contact with said means for rendering said film contacting means operative to increase said stretch of the film for operating said means upon the movement of said actuating member whereby the stretch of said film may be increased without destroying the protective relation of said casing to said light sensitive film.

65. In a film handling apparatus, continuously operating means for supporting a light sensitive film, intermittently operating means for feeding said film in relation to said continuously operating means, means for increasing the stretch of said film between said continuous and intermittent means initially or if during the normal feeding operation such stretch should become abnormally shortened, a casing enclosing all of said means and said light sensitive film for protecting said film from the action of light during said normal feeding operation, said stretch increasing means including film contacting means disposed within said casing, joint means effective both for rendering said film contacting means operative to increase said stretch of the film and also concomitantly effective to render said feeding means ineffective for feeding the film, said means also being disposed within said casing, a movable actuating member disposed exteriorly of said casing, and an operating connection extending from said actuating member to the interior of said casing and into operative contact with said means for rendering said film contacting means operative to increase said stretch of the film and for rendering said feeding means ineffective upon the film for operating said joint means upon the movement of said actuating member whereby the stretch of said film may be increased and the feeding movement of the film stopped without destroying the protective relation of said casing to said light sensitive film.

66. In a film handling apparatus, supporting means for a film for supplying film freely in response to the movement of the film away from said supporting means, a driven take-up means for winding up the film, a member engaging the film for drawing the film from said supporting means in order to increase the stretch thereof, a toothed member engaging the film between said film engaging member and said supporting means for regularly feeding the film, such engagement normally preventing said first mentioned film engaging member from drawing the film from said supporting means, means for separating the film and the teeth of said feeding member whereby said first mentioned film engaging member may draw the film from said supporting means, and means for operating said first mentioned film engaging member for drawing the film from said supporting means so that the stretch of the film between said film engaging member and said supporting means is increased.

67. In a film handling apparatus, supporting means for a film for supplying film freely in response to the movement of the film away from said supporting means, a driven take-up means for winding up the film, a member engaging the film for drawing the film from said supporting means in order to increase the stretch thereof, a toothed member disposed between said film engaging member and said supporting means for regularly feeding the film, means for normally maintaining the film and said toothed feeding member in operative engagement one with the other, such engagement normally preventing said film engaging member from drawing the film from said supporting means, means for rendering said maintaining means ineffective, and means for operating said film engaging member for drawing the film from said supporting means so that the stretch of the film between said film engaging member and said supporting means is increased.

68. In a film handling apparatus, supporting means for a film for supplying film freely in response to the movement of the film away from said supporting means, a member engaging the film for drawing the film from said supporting means, a toothed member engaging the film between said film engaging member and said supporting means for regularly feeding the film, a driven take-up means for winding up the film, means for normally maintaining the film in a narrow passage and under pressure so that it may be engaged and fed by said toothed member, such engagement normally preventing said film engaging member from drawing the film from said supporting means, means for creating an unimpeded and enlarged passage for the film between said supporting means and said film engaging member so that said film engaging member may draw the film from said supporting means without hindrance, and means for operating said film engaging member for drawing the film from said supporting means while said means for creating said unimpeded passage is effective whereby the stretch of the film between said film engaging member and said supporting means is increased.

69. In a film handling apparatus, an idling delivery reel and a continuously driven take-up reel, a toothed intermittently driven feeding member engaging the film between said reels, said feeding member and said reels being so disposed that said feeding member draws film from said delivery reel without interference by an intermediate toothed feeding member and said continuous take-up reel draws film from said intermediate member without interference by an intermediate toothed feeding member, a compensating member engaging the film between said intermittent toothed member and said delivery reel, a compensating member engaging the film between said intermittent toothed member and said continuous take-up reel, means for separating the film and the teeth of said intermittent feeding member, and means effective for thrusting each of said compensating members against the film while the film and the teeth of said feeding member are separated so that the stretch of the film adjacent each of said compensating members is increased, such separation of the film and the teeth of said feeding member enabling said compensating members to equalize the stretch of film adjacent each of the same, each of said compensating members being then adapted to pull film from a position adjacent the other of said compensating members in accordance with the supply of film then available in response to the movement of the compensating members.

70. In a film handling apparatus, a first film supporting means for supplying film freely in response to the movement of the film away from said supporting means, a second and yieldingly driven supporting means for winding up the film, a toothed feeding member engaging the film between said first and second supporting means for drawing film from said first supporting means and advancing it toward said second supporting means, said feeding member and said second supporting means being so disposed that second supporting means draws film from said toothed member, a first spring pressed tension member engaging the film between said toothed member and said first supporting means, a second spring pressed tension member engaging the film between said toothed member and said second supporting means, the engagement of said toothed member and the film normally preventing either of said film engaging members from drawing film from the other side of said toothed member, means for separating the film and the teeth of said feeding member, and means for maintaining said first and second spring pressed members in operative relation with the film while said separating means are effective whereby said spring pressed film engaging members may exert an unimpeded influence upon the film in order automatically to readjust the stretch of the film in preparation for a subsequent feeding operation thereupon.

71. In a film handling apparatus, a film supporting means for supplying film freely in response to the movement of the film away from said supporting means, a toothed feeding member engaging the film for drawing film from said first supporting means, a spring pressed tension member engaging the film upon the side of said toothed member opposite that upon which said supporting means is disposed, the engagement of said toothed member and the film normally preventing said film engaging member from drawing film from the other side of said toothed member, means for separating the film and the teeth of said member and means for maintaining said spring pressed member in operative relation with the film while said separating means are effective whereby said spring pressed film engaging member may exert an unimpeded influence upon the film in order automatically to adjust the stretch of the film by drawing film from the other side of said toothed member.

72. In a film handling apparatus having an intermittent film feeding mechanism, in combination, a shaft connected with said feeding mechanism, spring mechanism for rotating said shaft, and control means for said feeding mechanism including a plurality of revoluble toothed stop members disposed on said shaft and spaced apart therealong, the teeth of said stop members being arranged in different angular relations to the axis of said shaft, means having an element engaging a tooth of one of said stop members and having another element concomitantly movable into a position opposite a tooth of another of said stop members for predeterminedly stopping the rotation of said spring mechanism upon the rotation of said shaft, and means for operating said engaging means for releasing said first mentioned tooth so that said shaft may rotate.

74. In a film handling apparatus having an intermittent film feeding mechanism, in combination, a shaft connected with said feeding mechanism, spring mechanism for rotating said shaft, and control means for said feeding mechanism including a plurality of revoluble toothed stop members spaced apart on said shaft and a plurality of connected control members one of which engages a tooth of one of said stop members and another of which is movable into a position opposite a tooth of another of stop members for predeterminedly stopping the rotation of said shaft by said spring mechanism, means for releasing said first above-mentioned member and moving the other thereof into said above-mentioned position so that said shaft may rotate a predetermined amount, and means for shifting said control members along said shaft to a plurality of work stations wherein said stop members are effective for predeterminedly engaging desired revoluble stop members on such shaft.

73. In a film handling apparatus having an intermittent film feeding mechanism, in combination, a shaft connected with said feeding mechanism, spring mechanism for rotating said shaft, and control means for said feeding mechanism including a plurality of revoluble toothed stop members spaced apart on said shaft and a plurality of connected control members one of which engages a tooth of one of said stop members and another of which is movable into a position opposite a tooth of another of stop members for predeterminedly stopping the rotation of said shaft by said spring mechanism, and means for releasing said first above-mentioned member and moving the other thereof into said above-mentioned position so that said shaft may rotate a predetermined amount.

BARTON ALLEN PROCTOR.